(12) United States Patent
Veeramachaneni et al.

(10) Patent No.: US 11,468,529 B2
(45) Date of Patent: *Oct. 11, 2022

(54) PROTECT INTELLECTUAL PROPERTY (IP) RIGHTS ACROSS NAMESPACES

(71) Applicant: VERISIGN, INC., Reston, VA (US)

(72) Inventors: Srikanth Veeramachaneni, South Riding, VA (US); William Shorter, Sterling, VA (US); James Gould, Leesburg, VA (US)

(73) Assignee: VeriSign, Inc., Reston, VA (US)

( * ) Notice: Subject to any disclaimer, the term of this patent is extended or adjusted under 35 U.S.C. 154(b) by 238 days.

This patent is subject to a terminal disclaimer.

(21) Appl. No.: 16/750,524

(22) Filed: Jan. 23, 2020

(65) Prior Publication Data
US 2020/0160468 A1   May 21, 2020

Related U.S. Application Data

(63) Continuation of application No. 13/626,455, filed on Sep. 25, 2012, now Pat. No. 10,565,666.
(Continued)

(51) Int. Cl.
*G06Q 50/18*   (2012.01)
(52) U.S. Cl.
CPC .................. *G06Q 50/184* (2013.01)
(58) Field of Classification Search
CPC ..................................................... G06Q 50/184
(Continued)

(56) References Cited

U.S. PATENT DOCUMENTS 6,446,133 B1   9/2002   Tan et al.
6,880,007 B1   4/2005   Gardos et al.
(Continued)

FOREIGN PATENT DOCUMENTS

CN   101444072 A   5/2009
EP   2658218 A1   10/2013
(Continued)

OTHER PUBLICATIONS

SSLShopper,SSLCertificate:WhyVerifyDomainOwnership?,httos:/Awww.sslshopper.com/article-ssl-certificate-why-verify-domain-ownership.html,datedDec. 16, 2007,pp. 1-3(Year:2007) (Year: 2007).*
(Continued)

*Primary Examiner* — Michael Young
(74) *Attorney, Agent, or Firm* — Baker Botts L.L.P.; Michael A. Sartori

(57) ABSTRACT

In some examples, a method for validating a consistency of sponsorship can include determining, by a DNS registry, that a second-level domain label of a requested domain name in a first top level domain is related to a second-level domain label of an existing domain name in a second top level domain that is grouped in a top level domain database with the first top level domain. The method can also include validating whether there is consistency of sponsorship between the requested domain name in the first top level domain and the existing domain name in the second top level domain. Additionally, the method can include performing an action related to the requested domain name in the first top level domain if there is consistency of sponsorship. Furthermore, the method can include providing results of the request to a client device.

20 Claims, 15 Drawing Sheets

Related U.S. Application Data

(60) Provisional application No. 61/539,265, filed on Sep. 26, 2011.

(58) Field of Classification Search
USPC .......................................................... 705/310
See application file for complete search history.

(56) References Cited

U.S. PATENT DOCUMENTS

| | | | |
|---|---|---|---|
| 6,895,430 | B1 | 5/2005 | Schneider |
| 6,901,436 | B1 | 5/2005 | Schneider |
| 6,973,505 | B1 | 12/2005 | Schneider |
| 6,980,990 | B2 | 12/2005 | Fellman |
| 7,188,138 | B1 | 3/2007 | Schneider |
| 7,194,552 | B1 | 3/2007 | Schneider |
| 7,299,299 | B2 | 11/2007 | Hollenbeck et al. |
| 7,565,402 | B2 | 7/2009 | Schneider |
| 7,797,413 | B2 * | 9/2010 | Adelman ............ H04L 63/0823 709/224 |
| 7,861,286 | B2 | 12/2010 | M'Raihi et al. |
| 8,037,168 | B2 | 10/2011 | Schneider |
| 8,224,994 | B1 | 7/2012 | Schneider |
| RE43,690 | E | 9/2012 | Schneider et al. |
| 8,370,217 | B1 | 2/2013 | Parsons et al. |
| RE44,207 | E | 5/2013 | Schneider |
| 8,458,161 | B2 | 6/2013 | Schneider |
| 8,612,565 | B2 | 12/2013 | Schneider |
| 8,635,340 | B1 | 1/2014 | Schneider |
| 8,719,900 | B2 | 5/2014 | MacCarthaigh |
| 8,819,795 | B2 | 8/2014 | Hitchcock et al. |
| 10,237,231 | B2 | 3/2019 | Gould et al. |
| 2002/0091703 | A1 | 7/2002 | Bayles |
| 2004/0172463 | A1 | 9/2004 | King et al. |
| 2004/0199493 | A1 | 10/2004 | Ruiz et al. |
| 2005/0102354 | A1 | 5/2005 | Hollenbeck et al. |
| 2006/0253456 | A1 | 11/2006 | Pacholec et al. |
| 2007/0271393 | A1 | 11/2007 | Wong |
| 2008/0016233 | A1 | 1/2008 | Schneider |
| 2008/0059607 | A1 | 3/2008 | Schneider |
| 2009/0327098 | A1 | 12/2009 | Ronen et al. |
| 2010/0036725 | A1 | 2/2010 | Turakhia |
| 2010/0325723 | A1 | 12/2010 | Essawi et al. |
| 2012/0173685 | A1 | 7/2012 | Shorter et al. |
| 2013/0080341 | A1 | 3/2013 | Veeramachaneni et al. |
| 2014/0189489 | A1 | 7/2014 | Bushlack et al. |
| 2015/0134832 | A1 | 5/2015 | Gould et al. |

FOREIGN PATENT DOCUMENTS

| | | | | |
|---|---|---|---|---|
| WO | 2001011443 | A2 | 2/2001 | |
| WO | 2004015547 | A2 | 2/2004 | |
| WO | WO-2004015547 | A2 * | 2/2004 | ....... H04L 29/12009 |

OTHER PUBLICATIONS

SSL Shopper, SSL Certificate: Why Verify Domain Ownership?, https://www.sslshopper.com/article-ssl-certificate-why-verify-domain-ownership.html, dated Dec. 16, 2007, pp. 1-3 (Year: 2007).*

"New EPP regulations now in effect" http://www.moniker.com/news/vol6/v6art5.jsp 2 pages, Jan. 10, 2007, retrieved from Internet ARchive Wayback Machine https://web.archive.org/web/20070110222202/http://www.moniker.com/news/vol6/v6art5.jsp on Jun. 29, 2015.

Author Unknown, "EPP Extensions for the .coop TLD Registrant Verification", Internet Article, Oct. 5, 2010, http://www.nic.coop/media/1517/EppExtensionsForDotCoop.pdf, accessed Sep. 11, 2013, pp. 1-16.

Wikipedia, "Extensible Provisioning Protocol", Internet Article, Jul. 15, 2011, http://en.wikipedia.org/w/index.phptitle=Extensible_Provisioning_Protocol oldid=439639435, accessed Sep. 11, 2013, pp. 1-2.

Wikipedia, "Transfer secret", Internet Article, Aug. 29, 2011, http://en.wikipedia.org/w/index.phptitle=Transfer_secret oldid=447393192, accessed Sep. 11, 2013, pp. 1-2.

Extended European Search Report dated Sep. 19, 2013, European Application No. 12186193.4, filed Sep. 26, 2012, pp. 1-7.

Registry/Registrar Documentation for the .barcelona TLD, Core Internet Council of Registrars, Aug. 28, 2013 [retrieved on Feb. 15, 2017]. Retrieved from the Internet: URL:http://corenic.org/files/CORERSDocumentationBARCELONA.pdf , pp. 1-51.

Manley, D. "Helpful How to for EPP registrars", Sourceforge.net, Sep. 28, 2001 [retrieved on Jan. 30, 2017]. Retrieved from the Internet: URL:http://epp-rtk.sourceforge.net/epp-howto.html , pp. 1-20.

TACACS and VTY, The Cisco Learning Network, Nov. 20, 2011 [retreieved on Feb. 14, 2017]. Retrieved from the Internet: URL:https://learningnetwork.cisco.com/thread/36861 ,pp. 1-9.

Hollenbeck, S. "RFC 5732—Extensible Provisioning Protocol (EPP) Host Mapping," Aug. 2009 [Retrieved on Feb. 14, 2017]. Retrieved from the Internet: URL:https://tools.ietf.org/html/rfc5732 , pp. 1-29.

Mitchell, J. et al. "Domain Name Variant Extension Mapping for the Extensible Provisioning Protocol (EPP)", AusRegistry, Dec. 2012 [retrieved on Feb. 14, 2017]. Retrieved from the Internet: URL:http://ausregistry.github.io/doc/variant-1.1/variant-1.1.txt, pp. 1-11.

Gould, J. "IDN Language Tag for the Extensible Provisioning Protocol (EPP)", Verisign Inc., Dec. 10, 2013 [retrieved an Feb. 15, 2017]. Retrieved from the Internet: URL:http://www.verisign.com/assets/epp-sdk/verisign_epp-extension_idn--lang_v00.html , pp. 1-5.

Gould, J. et al. "Related Domain Extension for the Extensible Provisioning Protocol (EPP)", Verisign Inc., Jan. 2, 2014 [retrieved on Feb. 15, 2017]. Retrieved from the Internet: URL:http://www.verisign.com/assets/epp-sdk/verisign_epp-extension_rel-ated-domain_v00.html ., 1-20.

Martinelli et al. 'The EPP server of the .it Registry: main features and functionalities', Istituto di Informatica e Telematica, Apr. 2010 [retrieved on Mar. 5, 2018]. Retrieved from the Internet: URL:https://core.ac.uk/download/pdf/37831876.pdf , pp. 1-109.

Author Unknown, "Medium Enterprise Design Profile (MEDP)—Network Security Design", Medium Enterprise Design Profile Reference Guide, http://www.3c3cc.com/c/en/us/td/docs/solutions/Enterprise/Medium_Enterprise_Design_Profile/MEDP/chap5.pdf, pp. 1-98.

Chinese Office Action issued in Chinese Patent Application No. 201410848610.7 dated Aug. 30, 2018.

Extended European Search Report dated Mar. 10, 2015, European Application No. 14192697.2 filed Nov. 11, 2014, pp. 1-6.

Hollenbeck, S., "ConsoliDate Mapping for the Extensible Provisioning Protocol", VerisignNaming and Directory Services, Mar. 22, 2005, 10 pages.

Notice of Allowance issued in U.S. Appl. No. 13/626,455 dated Sep. 25, 2019, pp. 1-10.

Notice of Allowance issued in U.S. Appl. No. 16/261,625 dated Apr. 30, 2020, pp. 1-21.

Office Action issued in U.S. Appl. No. 16/261,625 dated Sep. 11, 2020, 18 pages.

Notice of Allowance issued in U.S. Appl. No. 16/261,625 dated Jan. 6, 2021, pp. 1-7.

Notice of Allowance issued in U.S. Appl. No. 16/261,625 dated May 28, 2021, 13 pages.

Office Action issued in U.S. Appl. No. 17/233,118 dated Sep. 16, 2021, 4 pages.

* cited by examiner

PROTECT INTELLECTUAL PROPERTY (IP) RIGHTS ACROSS NAMESPACES

CROSS-REFERENCE TO RELATED APPLICATIONS

This application is a continuation of U.S. patent application Ser. No. 13/626,455, filed on Sep. 25, 2012, which claims priority to U.S. Provisional Patent Application No. 61/539,265, filed Sep. 26, 2011, the contents of which are incorporated by reference in their entireties.

TECHNICAL FIELD

The present invention relates to systems and methods for protecting intellectual property across namespaces and, more particularly, to systems for protecting intellectual property across top-level domains (TLDs).

BACKGROUND

Domain names are used to identify one or more Internet Protocol (IP addresses). Each domain name includes one or more characters (labels), each of which may either be an ASCII character or a language-specific character (e.g., Arabic, Chinese, Hindi, and Latin letters with diacritics (e.g., é)). Domain names represented, in whole or in part, by language-specific characters are called Internationalized Domain Names (IDNs).

In a domain name, each label is separated by dots. The right-most label conveys the top-level domain (TLD), and each label to the left specifies a subdomain of the domain to the right. For example, in the domain name "sub.example.com," "com" is the TLD, "example" is the second-level domain, and "sub" is the third-level domain. Examples of well-known TLDs include ".com," ".net," and ".org." While not yet available, potential IDN versions of these well-known TLDs could also be created (e.g. ".nét").

The responsibility for operating each TLD is delegated to a particular company or organization ("Registry"), such as VeriSign, by the Internet Corporation for Assigned Names and Numbers (ICANN). The Registry contracts with one or more ICANN-accredited Registrars, such as GoDaddy.com, to provide registration services for Internet end users (Registrants). For some TLDs (e.g., .com and .net) the Registry does not store any Registrant contact information. Instead, the Registry stores, among other things, basic domain information and the Registrar who registered the name. This is known as a "thin" registry. Accordingly, the Registry does not know the identity of the Registrant, and if that information is needed, the individual or organization seeking the information must contact the Registrar. Conversely, in a "thick" registry (e.g., .name and .org), the Registry stores much of the information associated with the domain name, including the Registrant contact information. Since the new TLDs are required to support RFC 5733 "EPP Contact Mapping," future IDN versions of TLDs such as .com and .net would need to support thick data.

Generally, the process for registering a domain name with a TLD begins when an Internet end user contacts a Registrar requesting to register a particular domain name. For example, Acme Corporation wishes to register the domain name "Acme.net." The Registrar may then determine if "Acme.net" is available by checking one or more databases associated with the .net TLD. If the domain name is available, Acme Corporation may then proceed with the registration process of "Acme.net." However, since the Registrar only checks a single TLD Registry, another Internet end user can register the same second-level domain label across a different TLD. For example, Beta Corporation could register "Acme.com." Additionally, even if Acme Corporation was proactive in protecting its IP and registered Acme across all available TLDs at the time of registration, with the introduction of new TLDs, including IDN TLDs, Acme's IP rights could still be infringed at a later date. Thus, Registrars need to be capable of connecting efficiently with each Registry operating related TLDs to determine the availability of each related namespace. Accordingly, consistency across all commands that can change the sponsorship of a domain is needed. In particular, consistency may need to be validated for domain creates, domain updates since Registrants cannot be changed, and domain transfers where the Registrar can be changed.

BRIEF SUMMARY

In some embodiments described herein, a system for validating a consistency of sponsorship can include a memory device storing instructions that, when executed by a processor, cause the processor to perform operations including providing a request for domain services from a server of a DNS registry to a processing unit of the DNS registry. In some examples, the processing unit performs operations including determining, by the DNS registry, that a second-level domain label of a requested domain name in a first top level domain is related to a second-level domain label of an existing domain name in a second top level domain that is grouped in a top level domain database with the first top level domain. The operations can also include validating whether there is consistency of sponsorship between the requested domain name in the first top level domain and the existing domain name in the second top level domain. Additionally, the operations can include performing an action related to the requested domain name in the first top level domain if there is consistency of sponsorship, wherein the action includes grouping the requested domain name in the first top level domain with the existing domain name in the second top level domain and linking the requested domain name in the first top level domain with the existing domain name in the second top level domain in a linked domain database associated with the DNS registry, wherein the action is performed, and the top level domain database and the linked domain database are updated, based on the grouping using one or more extensible provisioning protocol (EPP) commands. Furthermore, the operations can include providing results of the request to a client device.

In some examples, validating consistency of sponsorship can include, if the first top level domain and the second top level domain are thin, validating that a first registrar associated with the first top level domain and a second registrar associated with the second top level domain are related. In some embodiments, if the first top level domain and the second top level domain are thick, operations can include validating that (1) the first registrar and the second registrar are related; and (2) a first registrant associated with the first top level domain and a second registrant associated with the second top level domain are related.

In some examples, validating that the first registrar associated with the first top level domain and the second registrar associated with the second top level domain are related includes validating that the first registrar associated with the first top level domain and the second registrar associated with the second top level domain are the same. In some examples, validating that (1) the first registrar and the second registrar are related and (2) the first registrant associated with the first top level domain and the second registrant associated with the second top level domain are related includes validating that (1) the first registrar and the second registrar are the same and (2) the first registrant associated with the first top level domain and the second registrant associated with the second top level domain are the same.

In some embodiments, the operations further include registering one or more variants of an internationalized domain name with a shared top level domain in the top level domain database. In some examples, the operations further include accessing a variant database that stores information related to variants of second level domain labels to determine whether a variant of a requested second level domain name is stored in the variant database.

In some embodiments, the one or more extensible provisioning protocol (EPP) commands can include a domain check command that returns an availability or registered information across a set of grouped top level domains. In some examples, the operations can also include determining that a variant grouped with the requested domain name exists in the first top level domain or the second top level domain.

In some embodiments, the one or more extensible provisioning protocol (EPP) commands can include a single command to update the top level domain database and the linked domain database.

In some embodiments, the operations can include, if there is not consistency of sponsorship, determining whether a consent holder has given consent to allow at least one of the first registrant and the first registrar to register the requested domain name. In some examples, if the consent holder has given consent, the operations include allowing the at least one of the first registrant and the first registrar to register the requested domain name. In various implementations, if the consent holder has not given consent, the operations can include not allowing the at least one of the first registrant and the first registrar to register the requested domain name.

In some embodiments, the operations can include validating a received consent identifier by determining whether the received consent identifier is associated with a stored consent identifier, wherein the first registrant is allowed to register the requested domain name if the received consent identifier is validated. In some examples, the consent holder is automatically assigned based on whether the second top level domain is thin or thick.

In some embodiments, a method for validating a consistency of sponsorship can include determining, by a DNS registry, that a second-level domain label of a requested domain name in a first top level domain is related to a second-level domain label of an existing domain name in a second top level domain that is grouped in a top level domain database with the first top level domain. The method can also include validating whether there is consistency of sponsorship between the requested domain name in the first top level domain and the existing domain name in the second top level domain. Additionally, the method can include performing an action related to the requested domain name in the first top level domain if there is consistency of sponsorship, wherein the action comprises grouping the requested domain name in the first top level domain with the existing domain name in the second top level domain and linking the requested domain name in the first top level domain with the existing domain name in the second top level domain in a linked domain database associated with the DNS registry, wherein the action is performed, and the top level domain database and the linked domain database are updated, based on the grouping using one or more extensible provisioning protocol (EPP) commands. Furthermore, the method can include providing results of the request to a client device.

In some embodiments, one or more non-transitory computer-readable media for validating a consistency of sponsorship can include a plurality of instructions that, in response to execution by a processor, cause the processor to perform operations including determining, by a DNS registry, that a second-level domain label of a requested domain name in a first top level domain is related to a second-level domain label of an existing domain name in a second top level domain that is grouped in a top level domain database with the first top level domain. The operations can also include validating whether there is consistency of sponsorship between the requested domain name in the first top level domain and the existing domain name in the second top level domain. In some examples, the operations can include performing an action related to the requested domain name in the first top level domain if there is consistency of sponsorship, wherein the action comprises grouping the requested domain name in the first top level domain with the existing domain name in the second top level domain and linking the requested domain name in the first top level domain with the existing domain name in the second top level domain in a linked domain database associated with the DNS registry, wherein the action is performed, and the top level domain database and the linked domain database are updated, based on the grouping using one or more extensible provisioning protocol (EPP) commands. Furthermore, the operations can include providing results of the request to a client device.

In some examples, a non-transitory computer-readable storage medium can have instructions which, when executed on a processor, perform a method for validating consistency of sponsorship, the method comprising: determining whether a requested domain name in a first top level domain exists in a second top level domain that is grouped with the first top level domain; validating whether or not there is consistency of sponsorship between the requested domain name in the first top level domain and the existing domain name in the second top level domain; and performing an action related to the requested domain name in the first top level domain when there is consistency of sponsorship, wherein the requested domain name in the first top level domain is associated with a first registrar and a first registrant, wherein the existing domain name in the second top level domain is associated with second registrar and a second registrant, and wherein validating consistency of sponsorship comprising: validating that the first registrar and the second registrar are the same when at least one of the first top level domain and the second top level domain is thin; and validating that: (1) the first registrar and the second registrar are the same; and (2) the first registrant and the second registrant are the same, when the first top level domain and the second top level domain is thick.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the exemplary embodiments consistent with the present invention. Wherever possible, the same reference numbers will be used throughout the drawings to refer to the same or like parts. It is apparent, however, that the embodiments shown in the accompanying drawings are not limiting, and that modifications may be made without departing from the spirit and scope of the invention.

Systems and methods consistent with the invention provide a system for protecting intellectual property (IP) rights of a namespace. As used herein, the term "namespace" broadly refers to any separation of objects where there is a defined owner or sponsor of the object. The detailed description below provides further examples of a namespace, such as, for example, a second-level domain label (e.g., a domain name) of a TLD. The namespace protection system may determine whether a requested domain name exists in a second TLD that is grouped with a first TLD, and validate whether or not there is consistency of sponsorship between the requested domain name in the first TLD and any existing domain name in the second TLD.

Figure 1:
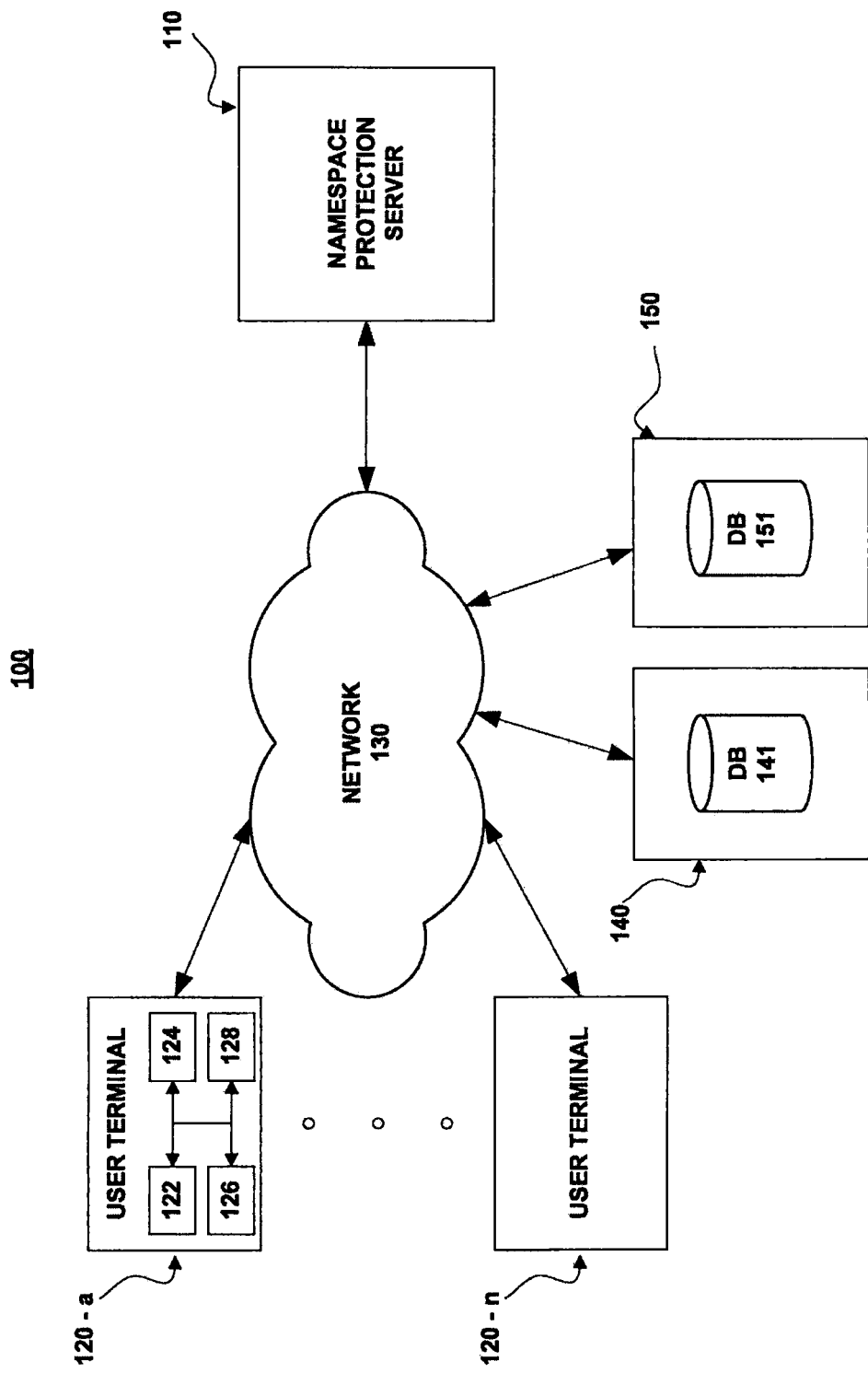
FIG. 1 is a block diagram of an exemplary namespace protection system 100 consistent with the present invention.

FIG. 1 is a block diagram of an exemplary namespace protection system 100 consistent with the present invention. One skilled in the art will appreciate that system 100 may be implemented in a number of different configurations without departing from the scope of the present invention. In the embodiment shown in FIG. 1, system 100 may include a namespace protection server 110, a plurality of user terminals 120-a to 120-n, a registry data repository 140, a registrar data repository 150, and a network 130 for connecting server 110 with terminals 120 and data repositories 140, 150. While FIG. 1 shows only one namespace protection server 110, two client terminals 120, and two data repositories 140, 150, system 100 may include any number of servers 110, terminals 120, and data repositories 140,150.

Namespace protection server 110 may be a computing system that performs various functions. In one embodiment, server 110 may be configured to process requests received from user terminals 120-a to 120-n to create, update, delete, check, or transfer a domain. In response to user requests, server 110 may validate whether the requested domain is grouped with any existing domains, determine whether the requesting Registrar and/or Registrant is consistent with the sponsor(s) of the existing domain or domains, and store and manage domain data, as well as other functions. The functions performed by namespace protection server 110 are described in greater detail below with respect to, for example, FIGS. 3-5.

Each user terminal 120 may be a computing system operated by a user. Terminal 120 may be used to display interface screens to request the creation, update, transfer, checking, and/or deletion of a domain, and for sending the request or requests to server 110 for processing. As shown in FIG. 1, user terminal 120 may include, for example, a processor 122, a memory 124, a display device 126, and an interface device 128. Processor 122 may be one or more processor devices, such as a microprocessor, laptop computer, desktop computer, workstation, mainframe computer, etc., that execute program instructions to perform various functions. Memory 124 may be one or more storage devices that maintain data (e.g., instructions, software applications, etc.) used by processor 122, such as volatile or non-volatile, magnetic, semiconductor, tape, optical, removable, nonremovable, or other type of non-transitory tangible storage device or non-transitory computer-readable medium. Although figure one only shows processor 122, memory 120, display device 126, and interface device 128 with respect to terminal 120-a, one or more of these components could be present in any other user terminals, such as user terminal 120-n.

In some embodiments, memory 124 may include browser software that enables user terminal 120-a to 120-n to transmit and retrieve domain request data to and from server 110 using a protocol such as HTML. Display device 126 may be any known type of display device that presents information to the user operating terminal 120-*a* to 120-*n*. Interface device 128 may be one or more known interface device modules that facilitate the exchange of data between the internal components of user terminal 120-*a* to 120-*n* and external components, such as server 110. In addition, interface device 128 may include a network interface device that allows user terminals 120-*a* to 120-*n* to receive and send data to and from network 130.

Network 130 may be any type of network that facilitates communication between remote components, such as server 110, user terminals 120, and data repositories 140, 150. For example, network 130 may be a local area network (LAN), a wide area network (WAN), a virtual private network, a dedicated intranet, the Internet, and/or a wireless network.

Namespace protection server 110 may also be communicatively connected to one or more data repositories 140, 150 through network 130. Registry data repository 140 may include one or more files or databases 141 that store information that is accessed by namespace protection server 110. Similarly, Registrar data repository 150 may include one or more files or databases 151. Databases 141, 151 may be configured using any appropriate type of known storage system configuration that facilitates the storage of data, as well as the locating, accessing, and retrieving of data stored in the database (e.g., Sybase, Oracle, MySQL, SQL, Access, etc. databases). The databases or other files may include, for example, data and information related to domain names, sponsoring registrar, sponsoring registrant, authorization information, statuses, domain life cycles, and any other domain attributes. Systems and methods of disclosed embodiments, however, are not limited to separate databases or remote databases that must be accessed via a network.

The arrangement illustrated in FIG. 1 is exemplary and system 100 may be implemented in a number of different configurations without departing from the scope of the present invention. For example, components 110 and 120 may be directly connected, as opposed to being connected via network 130. Similarly, components 140 and 150 can be directly connected to component 110 instead of being connected via network 130 and components 140 and 150 can be a single component that includes information from databases 141 and 151. Further, additional components may be included in system 100, such as a connection to other namespace protection systems or databases that may provide information to server 110. In addition, one or more user terminals 120 may be included within namespace protection server 110, thus allowing server 110 to receive requests from a user operating server 110 itself.

Figure 2:
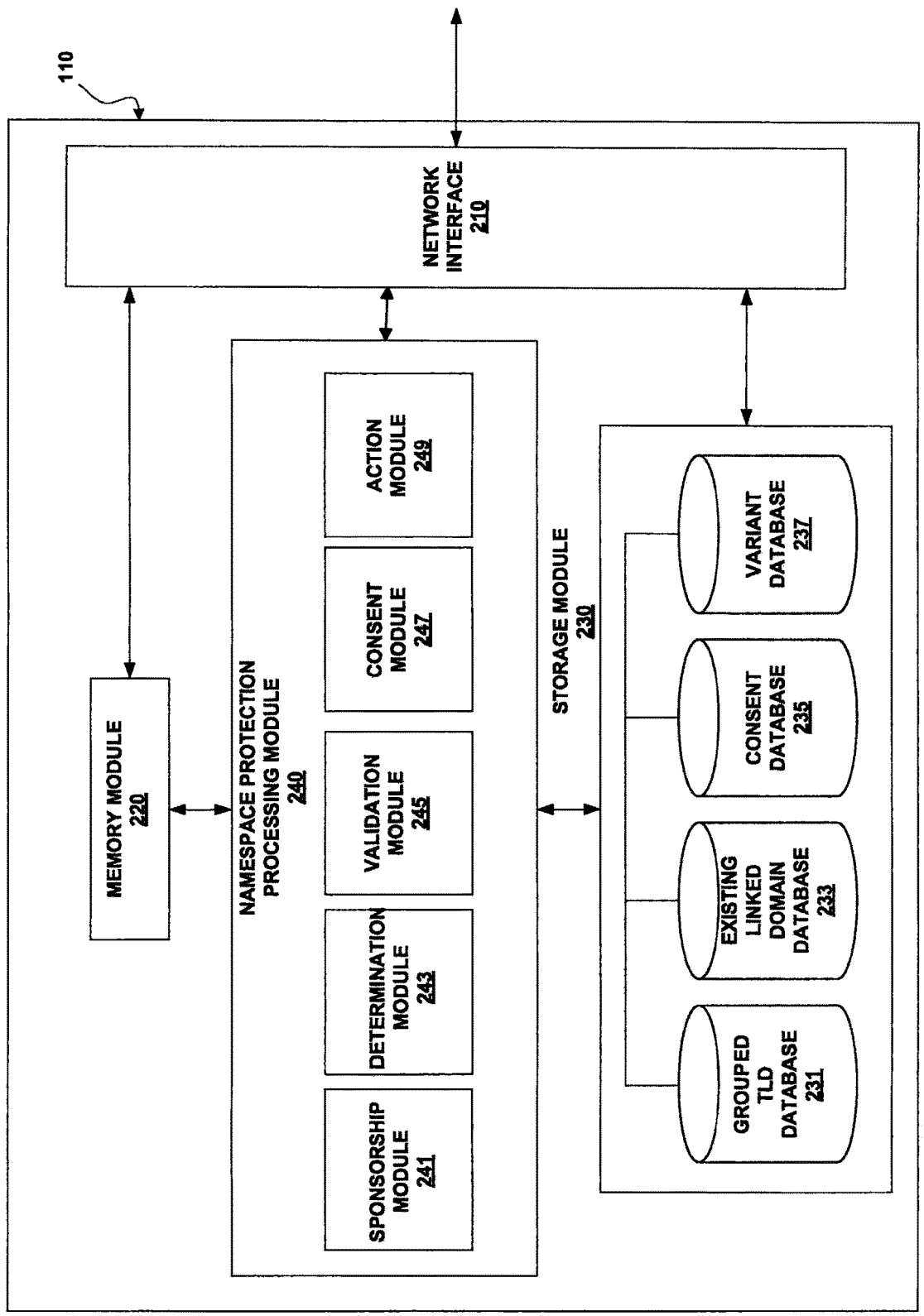
FIG. 2 is a block diagram of an exemplary embodiment of namespace protection server 110 consistent with the present invention.

FIG. 2 is a block diagram of an exemplary embodiment of namespace protection server 110. As shown in FIG. 2, namespace protection server 110 may further include a network interface 210, a memory module 220, a storage module 230, and a namespace protection processing module 240.

Network interface 210 may be one or more devices that facilitate the transfer of information between server 110 and external components, such as user terminals 120. Network interface module 210 may receive user requests from terminal 120 and route those requests to processing module 240. In exemplary embodiments, network interface module 210 may be a web server that receives requests from user terminals 120, forwards those requests to processing module 240, and returns the requested results to the requesting terminal 120 in the form of a web page.

Memory module 220 may represent one or more storage devices that maintain information that is used by processing module 240 and/or other components internal and external to attribute-based server 110. Further, memory module 220 may include one or more programs that, when executed by processing module 240, perform one or more processes consistent with embodiments of the present invention. Examples of such processes are described in greater detail below, with respect to, for example, FIGS. 3 to 5. Memory module 220 may also include configuration data that may be used by processing module 240 to present information to user terminals 120.

Processing module 240 may further include a sponsorship module 241, a determination module 243, a validation module 245, a consent module 247, and an action module 249. As described in more detail below, sponsorship module 241 may include components for communicating with one or more of databases 141, 150 in data repositories 140, 150 via network 130 and/or other remote or local databases to determine whether the requested domain name exists in a second TLD that is grouped with a first TLD and/or whether a variant grouped with the requested domain name exists in the first and/or second TLD.

Determination module 243 may include components for determining whether the first and second TLDs are thick or thin. As described above, in a "thin" TLD, the Registry does not know the identity of the Registrant while in a "thick" TLD the Registry knows the identity of the Registrar and Registrant. Validation module 245 may include components for determining whether the sponsorship information of the requestor of the first TLD is consistent with the sponsorship information of the second TLD. For example, and as described in greater detail below, validation module 245 may include a computer processor for matching the requestors sponsorship information with existing sponsorship information based on the determination by determination module 243 and/or other data associated with that information.

Consent module 247 may determine whether the Registrant and/or Registrar associated with the second TLD (i.e., the consent holder) has given consent for the registration of a conflicting domain (e.g., first TLD or variant) to another Registrant and/or Registrar. The consent holder may be assigned automatically, or through some other means. For example, the consent holder for a thin TLD may be the Registrar and for a thick TLD may be the Registrant.

Action module 249 may retrieve and process data from one or more modules 241, 243, 245, 247 and/or databases 231, 233, 235 (described below) to perform a requested action and update databases using a single EPP command. Namespace protection server 110 may also include an interface module (not shown). The interface module may include components for preparing and presenting information to terminals 120 via network interface 210. Furthermore, the interface module may retrieve and process data from memory module 220 in presenting the information to user terminals 120 via network interface 210. Modules 241-249 may be separate components or be implemented as one or more components of system 100. Furthermore, some modules may be omitted from system 100 such as, for example, consent module 247.

As shown in FIG. 2, namespace protection server 110 may also include interconnected databases 231, 233, 235, 237. In this regard, server 110 may include a database module (not shown) having components for controlling access to databases 231 to 237. Such a database module may include a query function that, in response to a request, may query information stored in one or more of databases 231 to 237 to identify information meeting specified criteria. Databases 231 to 237 may be configured using any appropriate type of known storage system configuration that facilitates the storage of data, as well as the locating, accessing, and retrieving of data stored in the databases (e.g., Sybase, Oracle, MySQL, SQL, Access, etc. databases). Furthermore, while in some embodiments databases 231-237 are stored in server 110, databases 231-237 may be remote to server 110. Furthermore, information contained in one or more of databases 231-237 may be stored in a single database, or in the Registry and/or Registrar data repositories 140, 150.

Grouped TLD database 231 may store grouped IDN versions of TLDs as well as information related to whether the TLD is thick or thin. For example, grouped TLD database 231 may store and group IDN versions of ".com" and the ASCII version of ".com" together, as well as information that the ASCII version of ".com" is thin and the IDN versions of ".com" are thick. Linked domain database 233 may store one or more registered domain names that have been linked together. For example, linked domain database 233 may store "example.com," "example.net," "example.idn1," and "example.idn2" as grouped domains. Consent database 235 may store information relating to a consent identifier, such as a token. Variant database 237 may store information relating to variants of domain labels (e.g., second level, third level and the like).

Figure 3:
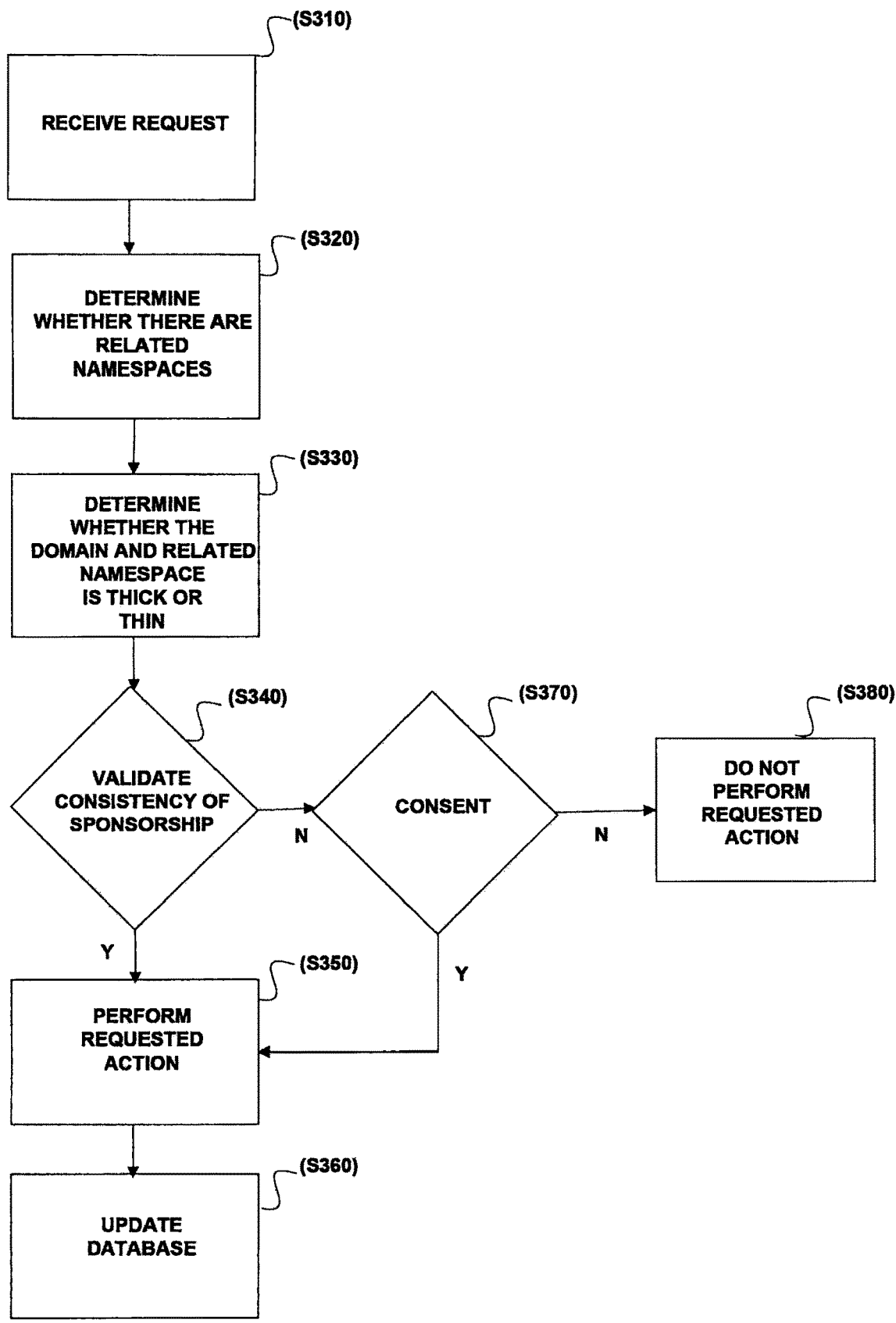
FIG. 3 is a flowchart demonstrating an exemplary process for protecting intellectual property rights of namespace consistent with the present invention.

FIG. 3 is a flowchart demonstrating an exemplary process for protecting intellectual property rights of namespace consistent with the present invention. For example, namespace protection system 100 may use the process of FIG. 3 to create, update, transfer, delete a domain. As shown in FIG. 3, the process may begin when the system 100 receives a request, such as a request associated with a second-level domain label of a first TLD (S301). The request may relate to creating a domain, deleting a domain, updating a domain, and/or transferring a domain. In exemplary implementations, system 100 may receive the request from a Registrant or a Registrar operating one or more user terminals 120a-n.

Sponsorship module 241 may determine whether there are existing namespaces related to the requested namespace. For example, sponsorship module 241 may determine whether a requested second-level domain label exists in a second TLD that is grouped with the first TLD or whether a variant of the requested second-level domain label exists (S320). In exemplary implementations, sponsorship module 241 may communicate with one or more of grouped TLD database 231, existing linked domain database 233, variant database 237, and registry data repository 140.

After a determination regarding whether there are existing related namespaces, determination module 241 may determine whether the requested namespace and/or the existing namespace or namespaces are located in thick or thin registries (S330). For example, determination module 241 may communicate with one or more of databases 231-237 and data repositories 140, 150 to obtain information used in the determination.

Validation module 245 may validate the consistency of sponsorship between the requested namespace and the existing namespace (S340). In exemplary embodiments, validation module 245 may validate consistency of sponsorship between second level domain labels across multiple TLDs based whether the TLDs are thick or thin. Furthermore, in exemplary embodiments the validation module determines whether to use information related to one or more of the sponsoring Registrars and/or Registrants in the validation process based on the determination by determination module 241 in S330. An exemplary validation process is described in greater detail in FIG. 4.

If validation module determines that there is not consistency of sponsorship, the system 100 determines whether a consent identifier has been generated (S370) and allow other Registrants or Registrars to register related namespaces. In exemplary embodiments, consent module 247 communicates with consent database 174 to determine whether the sponsor has agreed to ungroup the related namespaces. If so, the system 100 performs the requested action (S350). If not, the action module 249 of system 100 does not perform the requested action (S380). Any exemplary consent process is described in greater detail in FIG. 5.

However, if the validation module 245 determines that there is consistency of sponsorship, action module 249 performs the requested action (S350) and updates one or more databases (S360). For example, if a new domain is created, that domain is linked with the existing domain and information related to the linked domains is stored in existing linked domain database 233.

System 100 may implement one or more portions of the process of FIG. 3. For example, system 100 does not need to receive a request to perform one or more of the steps shown in FIG. 3. Furthermore, while the above-described exemplary embodiment refers to communication with a single Registry data repository 140 and a single Registrar data repository 150, system 100 may communicate with multiple databases. Additionally, system 100 may not need to determine whether there is consent before failing to perform a requested action.

Figure 4:
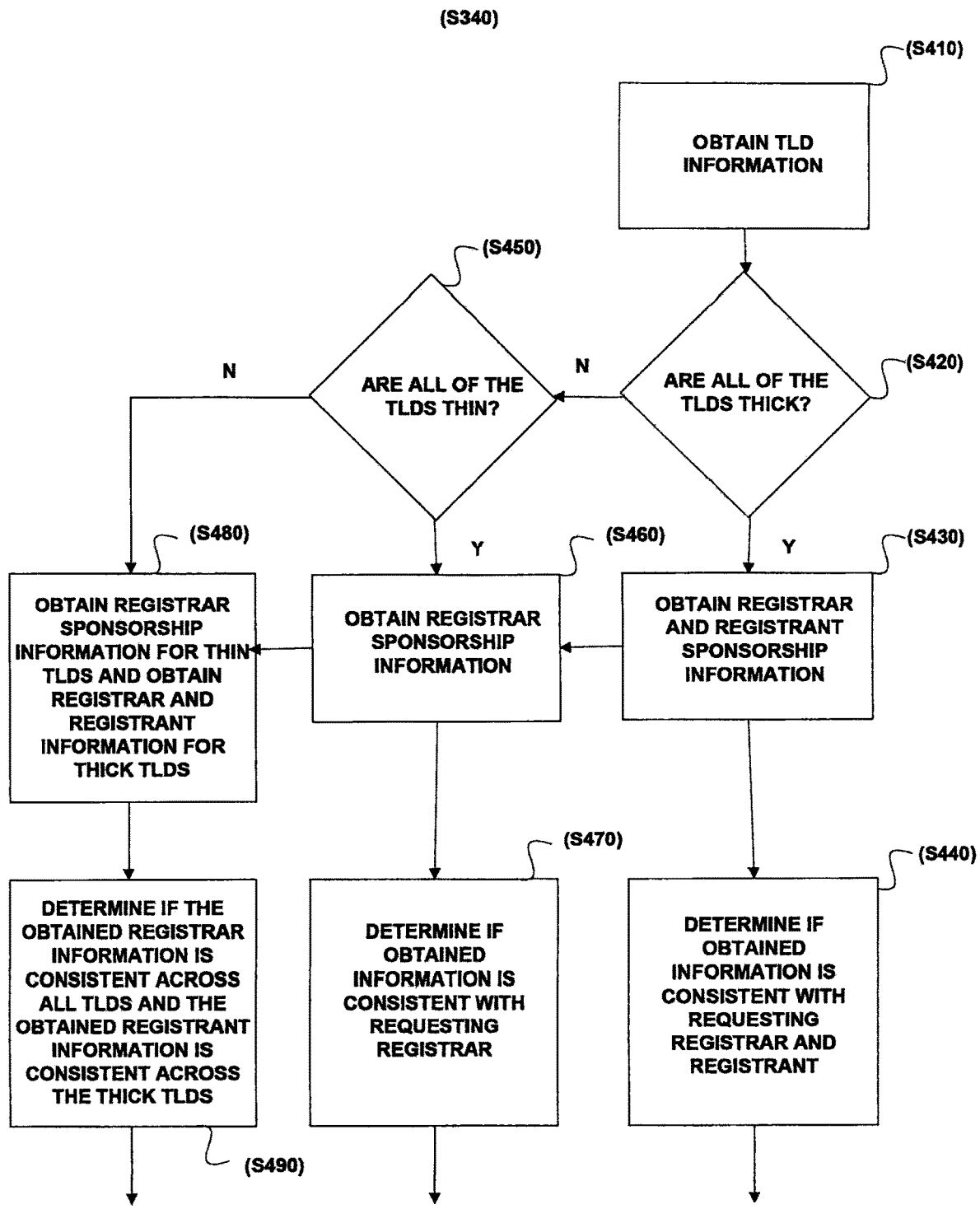
FIG. 4 illustrates an exemplary process consistent with the present invention for validating consistency of sponsorship as described above with respect to stage 340 of FIG. 3.

FIG. 4 illustrates an exemplary process for validating consistency of sponsorship as described above with respect to stage 340 of FIG. 3. As shown in FIG. 4, the process may begin by obtaining information related to the requested namespace (S410). In exemplary embodiments, validation module 245 obtains information from determination module 243 regarding whether the requested domain name exists in one or more TLDs that are grouped with the requested TLD. Validation module 245 then determines if the existing TLD or TLDs and the requested TLD are all thick (S420). If so, validation module 245 may obtain Registrar and Registrant sponsorship information related to the existing TLD(s) from one or more of Registry database 141. After the sponsorship information is obtained, validation module 245 determines whether the obtained information regarding the existing Registrar and Registrant is consistent with information related to the requesting Registrar and Registrant (S440).

If both the existing and requested TLDs are not thick, validation module 245 determines whether each of the existing and requested TLDs are thin (S450). If so, validation module 245 obtains Registrar sponsorship information related to the existing TLD(s) from one or more of Registry database 141 and Registrar database 151 (S460). After the sponsorship information is obtained, validation module 245 determines whether the obtained information regarding the Registrar is consistent with information related to the requesting Registrar (S470).

If all of the requested TLDs and existing TLDs are not thin (i.e., there are a combination of thick and thin TLDs), validation module 245 obtains Registrar sponsorship information related to the existing and/or requested thin TLDs and obtains Registrar and Registrant sponsorship information related to the existing and/or requested thick TLDs (S480) from one or more of databases 141. After the sponsorship information is obtained, validation module 245 determines whether: (1) the obtained information regarding the Registrar(s) is consistent across all of the existing TLDs and the information related to the requesting Registrar; and (2) the obtained information regarding the Registrant(s) is consistent across all of the existing and/or requested thick TLDs (S490). Validation module 245 may pass its consistency of sponsorship determination to action module 249.

If validation module determines that there is consistency of sponsorship, action module 249 may perform one or more actions associated with the request such as, for example, domain creates, domain updates, and domain transfers. While in the above-described embodiment validation module 245 determines whether the TLDs are thick or thin using particular steps, embodiments consistent with the invention need not perform all of the steps in FIG. 4 or perform the steps listed in the order presented in FIG. 4. For example, validation module 245 may determine whether the all of the TLDs are thin before determining whether all of the TLDs are thick. As another example, validation module 245 may determine whether each individual TLD is thick or thin.

Figure 5:
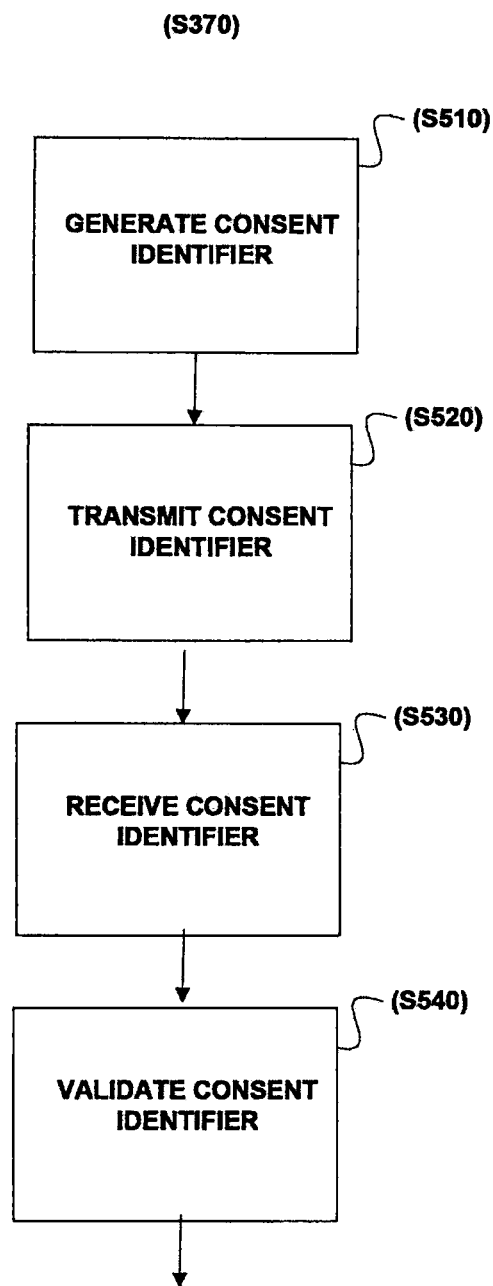
FIG. 5 illustrates an exemplary process consistent with the present invention for determining whether there is consent by the consent holder to register a domain grouped with an existing domain as described above with respect to stage 370 of FIG. 3.

FIG. 5 illustrates an exemplary process for determining whether there is consent by the consent holder to register a domain grouped with an existing domain as described above with respect to stage 370 of FIG. 3. As shown in FIG. 5, the process may begin by generating a consent identifier and determining whether the consent identifier has been passed by the Registrar (S510) to allow another Registrant and or Registrar to register the grouped domain. This determination may be made, for example, by obtaining information from one or more of consent database 235, Registry data repository 140, and/or another database and comparing that information with information related to the consent holder. In some embodiments, this information may be obtained in real-time without the need to consult any databases and may be done on a per domain basis without the use of a consent identifier. For example, a secure mechanism such as digital signatures could be employed where the Registry could sign the consent with a private key that would subsequently be passed by the Registrar and/or Registrant and verified using the associated public key by the Registry. In the above-described exemplary process, the consent holder may be the first Registrant to register a particular namespace, may be a Registrant who has registered the most domains in a particular namespace, or may simply be designed under some other rule in order to controls the ability to give consent.

The consent identifier may be generated by the consent holder or could be generated by another party, such as the Registry or third party, and given to the Registrar and/or Registrant that has been given consent to register one or more objects in the related namespace. The consent identifier may be based on a numeric or alphanumeric sequence, and could be: (1) client generated in which the client (e.g., the consent holding Registrant) chooses a unique consent identifier following the complexity requirements of the server policy; (2) server generated consent in which the server generates a unique non-sequential consent identifier that is returned and may be based on a set of attributes that would have a high likelihood of being unique like the use of a signed hash of the domain name, record identifier, and create date; or (3) a compound identifier which uses a combination of a client specified identifier and a server generated identifier. The consent identifier may also be stored in one or more of databases 231-237, 141, 151, such as, for example, consent database 235. The consent identifier could also be signed by the Registry and subsequently validated by the Registry independent of a database.

The consent identifier may be transmitted to the consent holder and/or to the requesting Registrant (S520). The requesting Registrant may transmit the consent identifier to system 100, and the system 100 may then validate that the transmitted consent identifier is accurate (S530) by determining whether it is the same as or consistent with the generated consent identifier.

Figure 6:
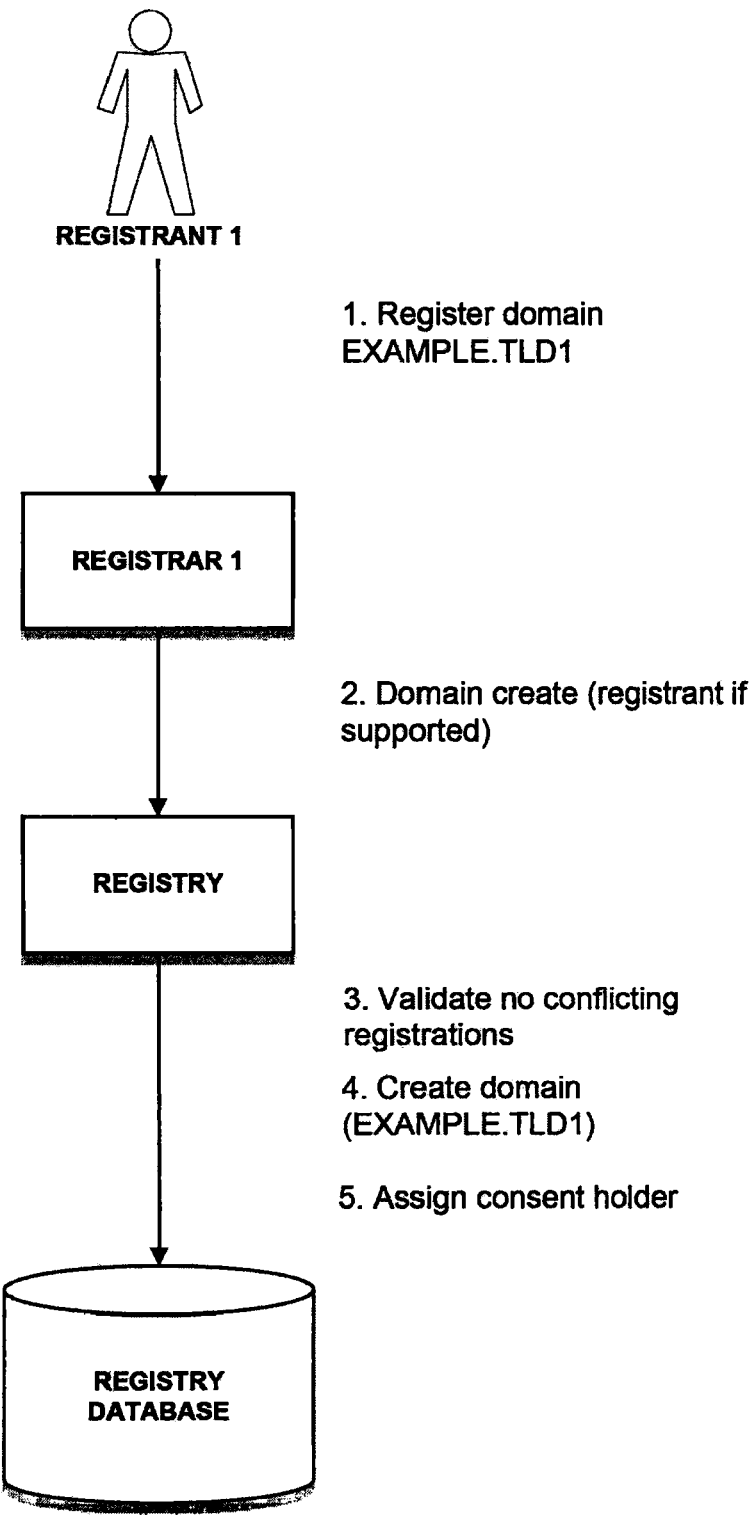
FIG. 6 demonstrates an exemplary domain create consistent with the present invention of EXAMPLE.TLD1 by Registrant 1 and Registrar 1 in which there are no namespaces related to EXAMPLE.TLD1.

FIGS. 6-12 are collaboration diagrams demonstrating examples of the process flow of system 100 implemented by a Registry. In particular, FIG. 6 demonstrates an exemplary domain create of EXAMPLE.TLD1 by Registrant 1 and Registrar 1 in which there are no namespaces related to EXAMPLE.TLD1. As shown in FIG. 6, Registrant 1 sends a request to Registrar 1 to register the domain EXAMPLE.TLD1. Subsequently, Registrar 1 sends a domain create request to the Registry. The Registry then validates that there are no conflicting registrations, creates the domain (EXAMPLE.TLD1) and assigns the Registrant as the consent holder for EXAMPLE.TLD1 and all of the related namespaces. This information is then stored in a Registry Database such as, for example, Registry database 141.

Figure 7:
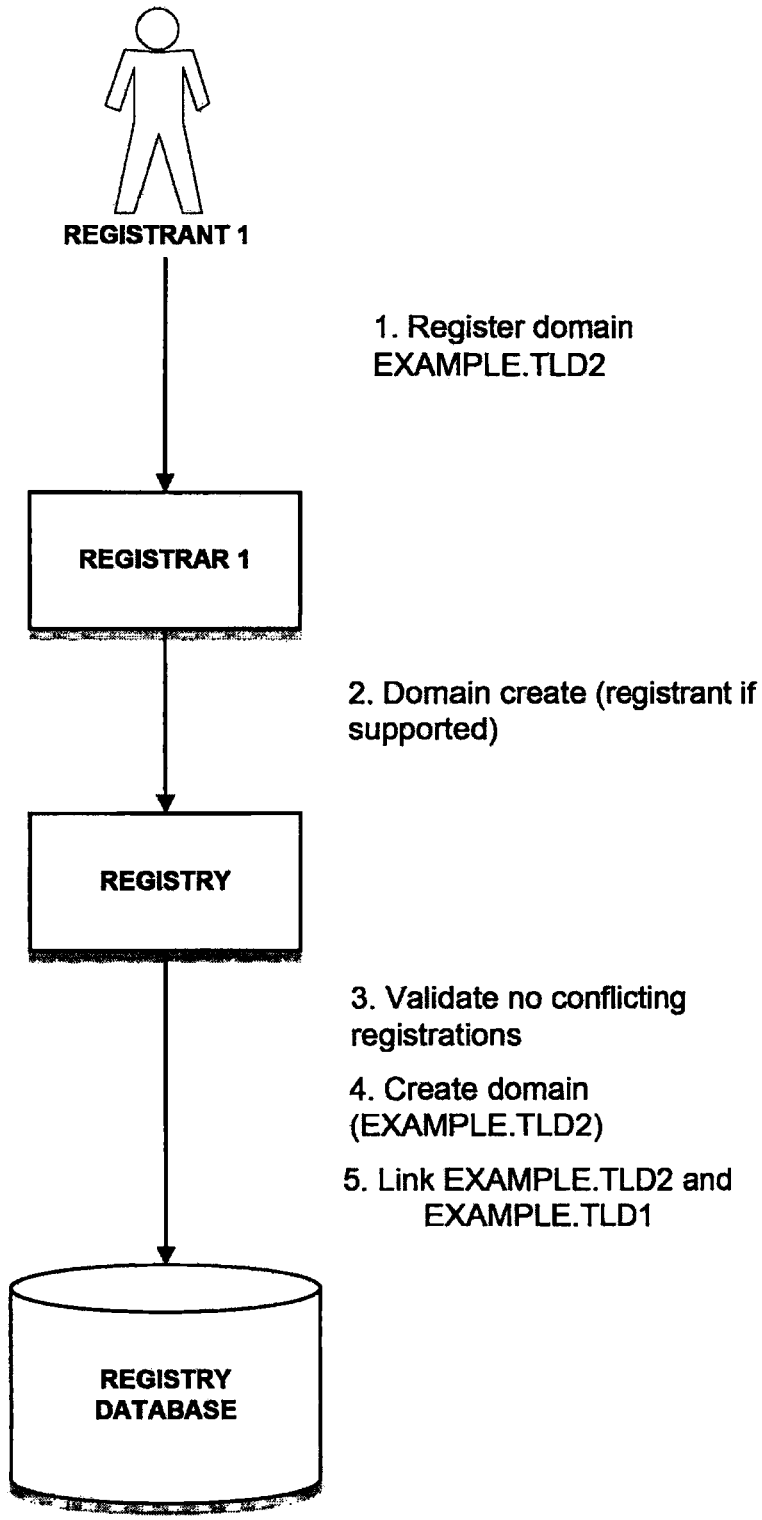
FIG. 7 demonstrates an exemplary domain create consistent with the present invention of EXAMPLE.TLD2 by Registrant 1 and Registrar 1 in which Registrant 1 has registered EXAMPLE.TLD1 through Registry 1.

FIG. 7 demonstrates an exemplary domain create of EXAMPLE.TLD2 by Registrant 1 and Registrar 1 in which Registrant 1 has registered EXAMPLE.TLD1 through Registry 1. As shown in FIG. 7, Registrant 1 sends a request to Registrar 1 to register the domain EXAMPLE.TLD2. Subsequently, Registrar 1 sends a domain create request to the Registry. The Registry then validates consistency of sponsorship between EXAMPLE.TLD2 and EXAMPLE.TLD1 and, since there is consistency of sponsorship, creates the domain EXAMPLE.TLD2. The Registry also links the domains EXAMPLE.TLD2 and EXAMPLE.TLD1, and stores this information in the Registry Database.

Figure 8:
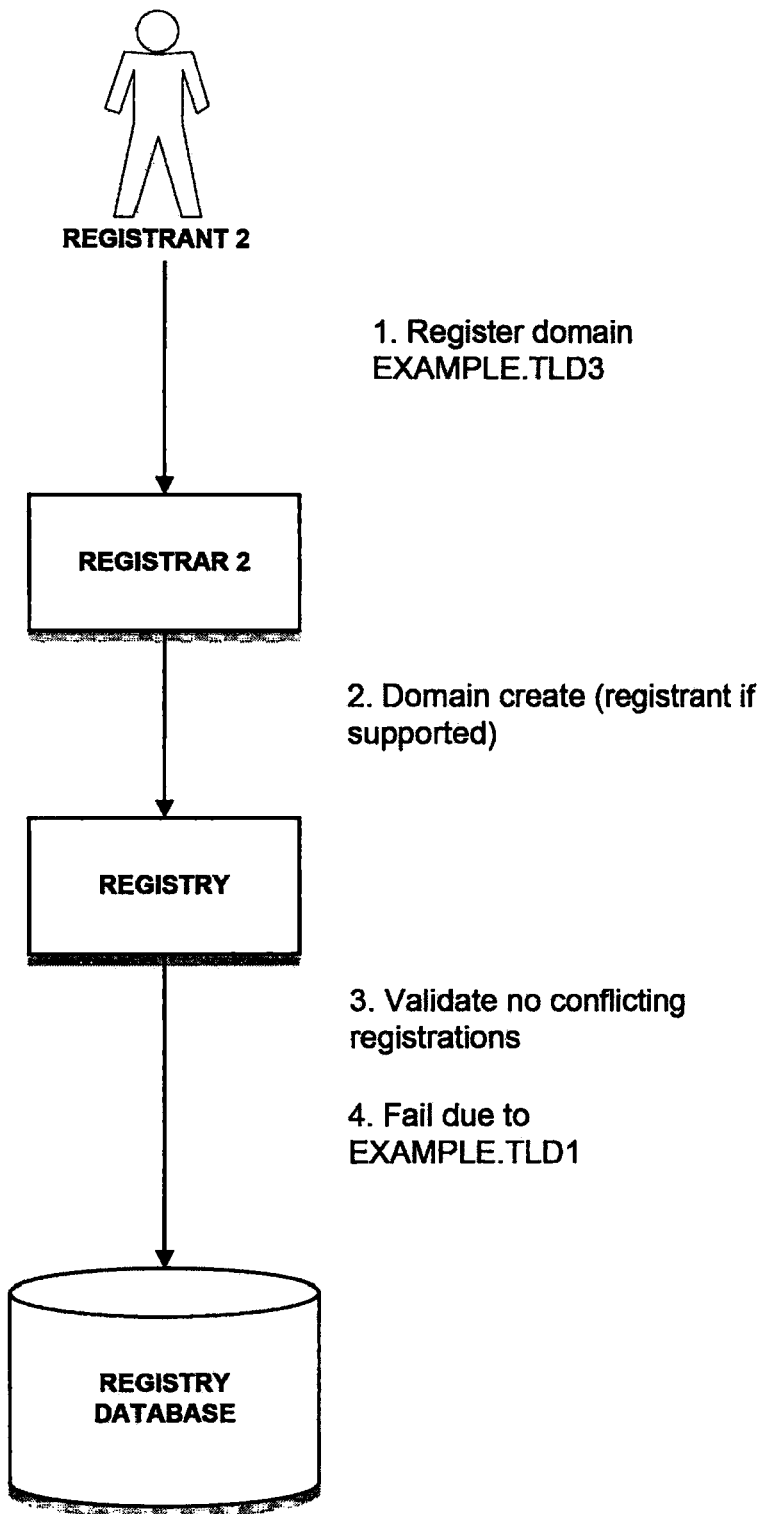
FIG. 8 demonstrates an exemplary attempted domain create consistent with the present invention of EXAMPLE.TLD3 by Registrant 2 and Registrar 2, where Registrant 1 and Registrar 1 have already registered EXAMPLE.TLD1 and have not given consent to register related namespaces.

FIG. 8 demonstrates an exemplary attempted domain create of EXAMPLE.TLD3 by Registrant 2 and Registrar 2, where Registrant 1 and Registrar 1 have already registered EXAMPLE.TLD1 and have not given consent to register related namespaces. As shown in FIG. 8, Registrant 2 sends a request to Registrar 2 to register the domain name EXAMPLE.TLD3. Subsequently, Registrar 2 sends a domain create request to the Registry. The Registry then validates whether there is consistency of sponsorship based on the process shown, for example, in FIG. 4, and determines that there are conflicting registrations (EXAMPLE.TLD1). Accordingly, the Registry does not create the domain EXAMPLE.TLD3.

Figure 9:
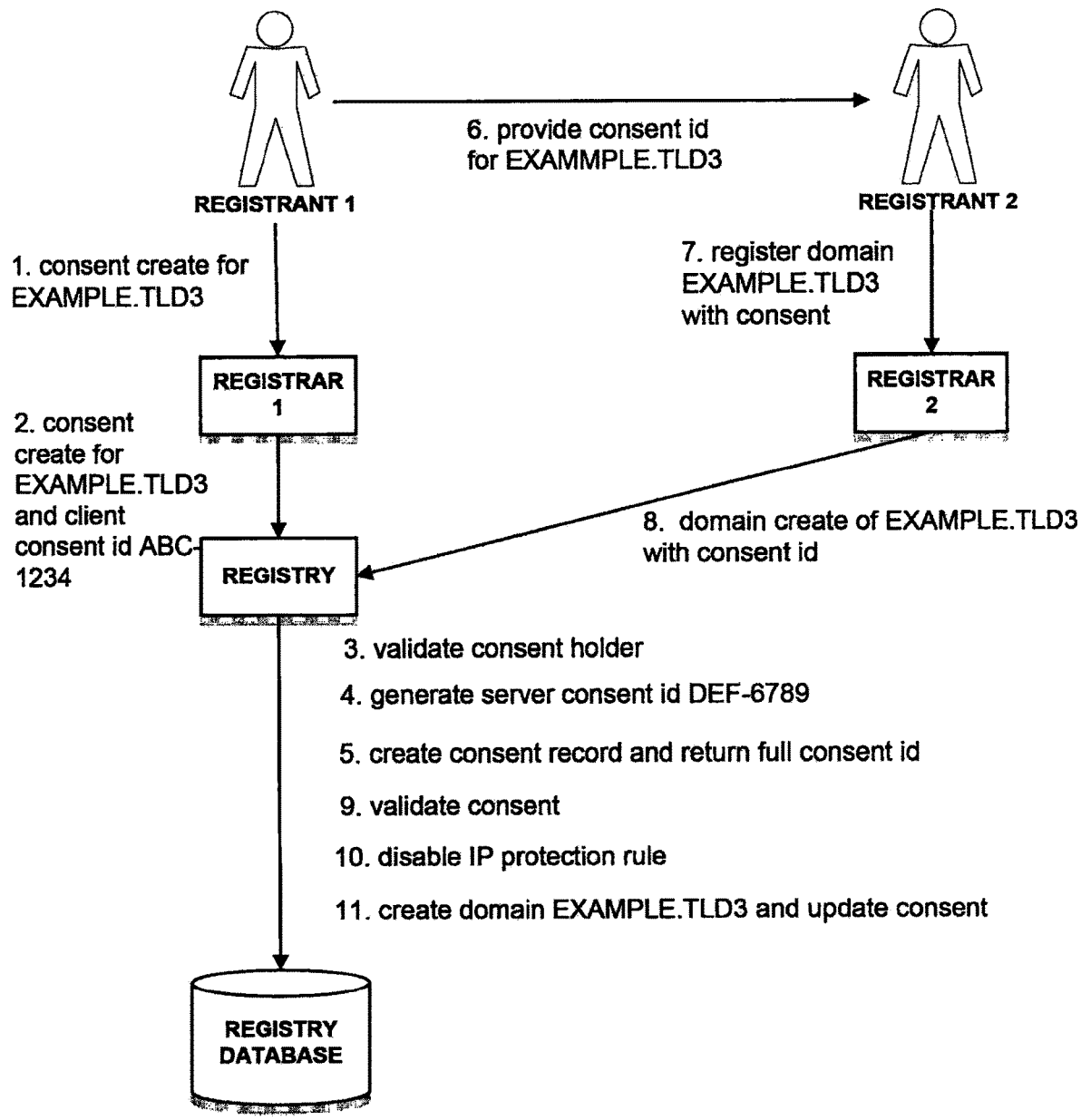
FIG. 9 demonstrates an exemplary attempted domain create consistent with the present invention of EXAMPLE.TLD3 by Registrant 2 and Registrar 2, where Registrant 1 and Registrar 1 have given consent for others to register related namespaces.

FIG. 9 demonstrates an exemplary attempted domain create of EXAMPLE.TLD3 by Registrant 2 and Registrar 2, where Registrant 1 and Registry 1 have given consent for others to register one or more related namespaces. As shown in FIG. 9, Registrant 1 creates a consent for EXAMPLE.TLD3 and passes that information to Registrar 1. Registrar 1 then creates a consent for EXAMPLE.TLD3 and a consent identifier (in this example ABC-1234) and passes that information to the Registry. The Registry then validates that Registrant 1 is the consent holder. Subsequently, the Registry generates a server consent id (in this case, DEF-6789) creates a consent record, and returns a full consent id. Registrant 1 then provides this consent ID for EXAMPLE.TLD3 to Registrant 2, who sends a request to Registrar 2 to register EXAMPLE.TLD3 with consent. Registrant 2 then sends a domain create request to the Registry, which validates the consent, disables the grouping validation, creates the domain EXAMPLE.TLD3, and updates the consent information in the Registry Database.

Figure 10:
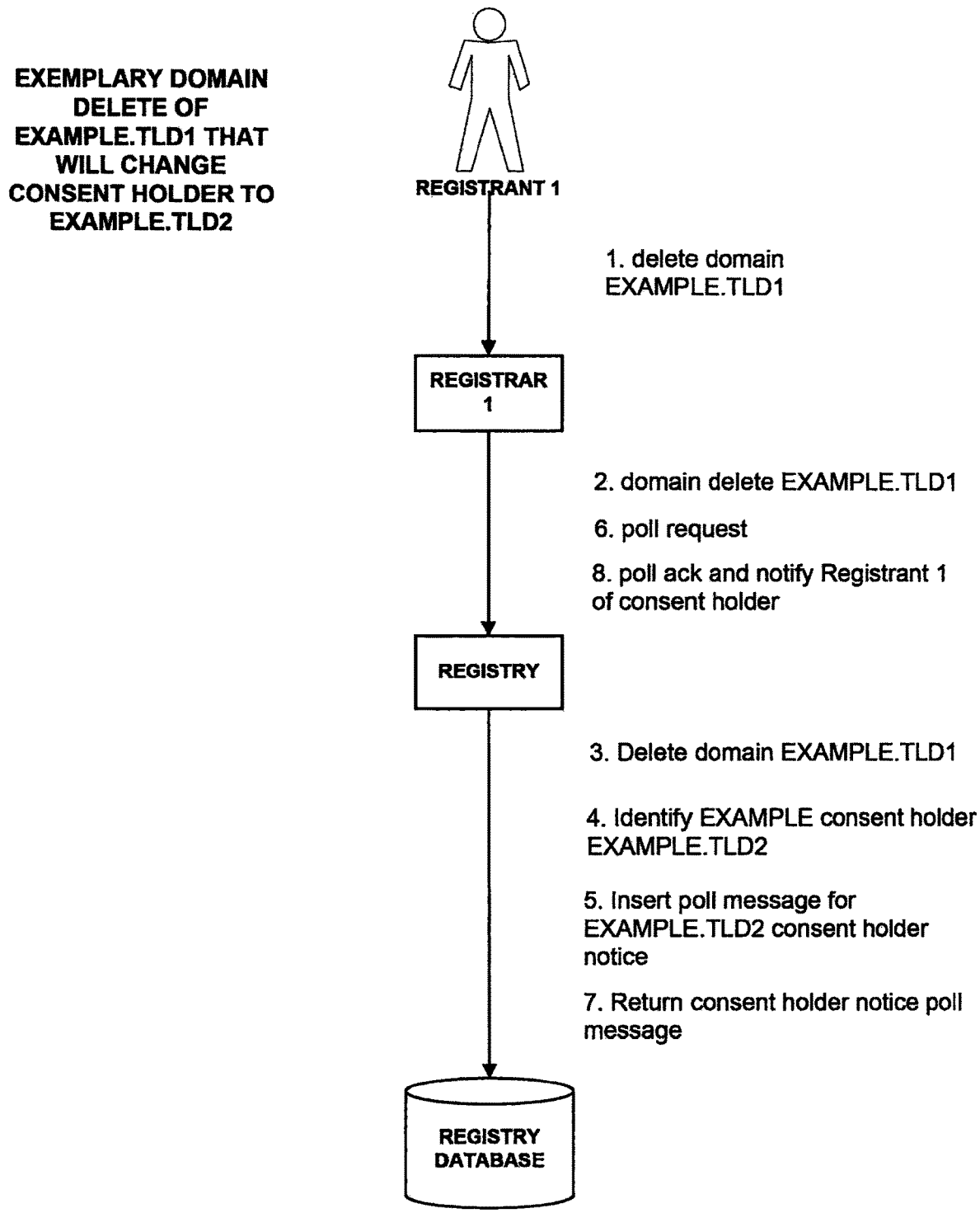
FIG. 10 demonstrates an exemplary domain delete consistent with the present invention of EXAMPLE.TLD1 that will change the consent holder to EXAMPLE.TLD2.

FIG. 10 demonstrates an exemplary domain delete of EXAMPLE.TLD1 that will change the consent holder to EXAMPLE.TLD2. As shown in FIG. 10, Registrant 1 sends a request to Registrar 1 to delete the domain EXAMPLE.TLD1. Registrar 1 then sends a domain delete request of EXAMPLE.TLD1 to the Registry. Subsequently, the Registry identifies that the new EXAMPLE namespace consent holder is the sponsor of EXAMPLE.TLD2. Accordingly, the Registry inserts a poll message for the EXAMPLE.TLD2 consent holder, the Registrar 1 sends a poll request to the Registry, the Registry returns a consent holder notice poll message, and the Registrar sends a poll acknowledgement and notifies Registrant 1 that he or she is the consent holder.

Figure 11:
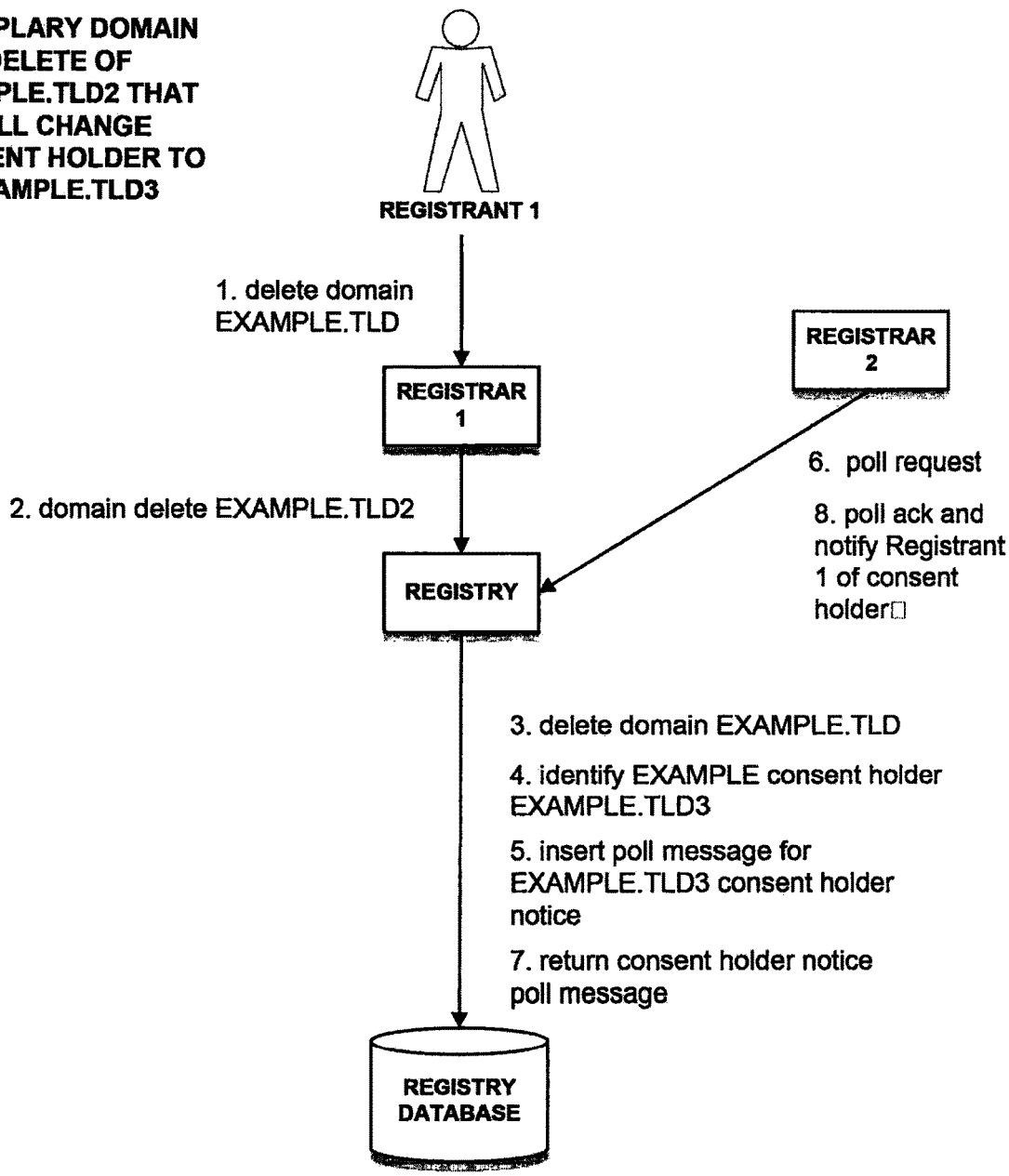
FIG. 11 demonstrates an exemplary domain delete consistent with the present invention of EXAMPLE.TLD2 that will change the consent holder to EXAMPLE.TLD3.

FIG. 11 demonstrates an exemplary domain delete of EXAMPLE.TLD2 that will change the consent holder to EXAMPLE.TLD3. As shown in FIG. 11, Registrant 1 sends a request to Registrar 1 to delete the domain EXAMPLE.TLD2. Registrar 1 then sends a domain delete request to the Registry, who validates consistency of sponsorship and deletes the domain EXAMPLE.TLD2. The Registry also identifies the EXAMPLE consent holder as EXAMPLE.TLD3 and inserts a poll message for EXAMPLE.TLD3 consent holder notice. Registrar 2 then sends a poll request to the Registry, and the Registry returns a consent holder notice poll message. Registrar 2 then acknowledges the poll and notifies Registrant 1 of the consent holder.

Figure 12:
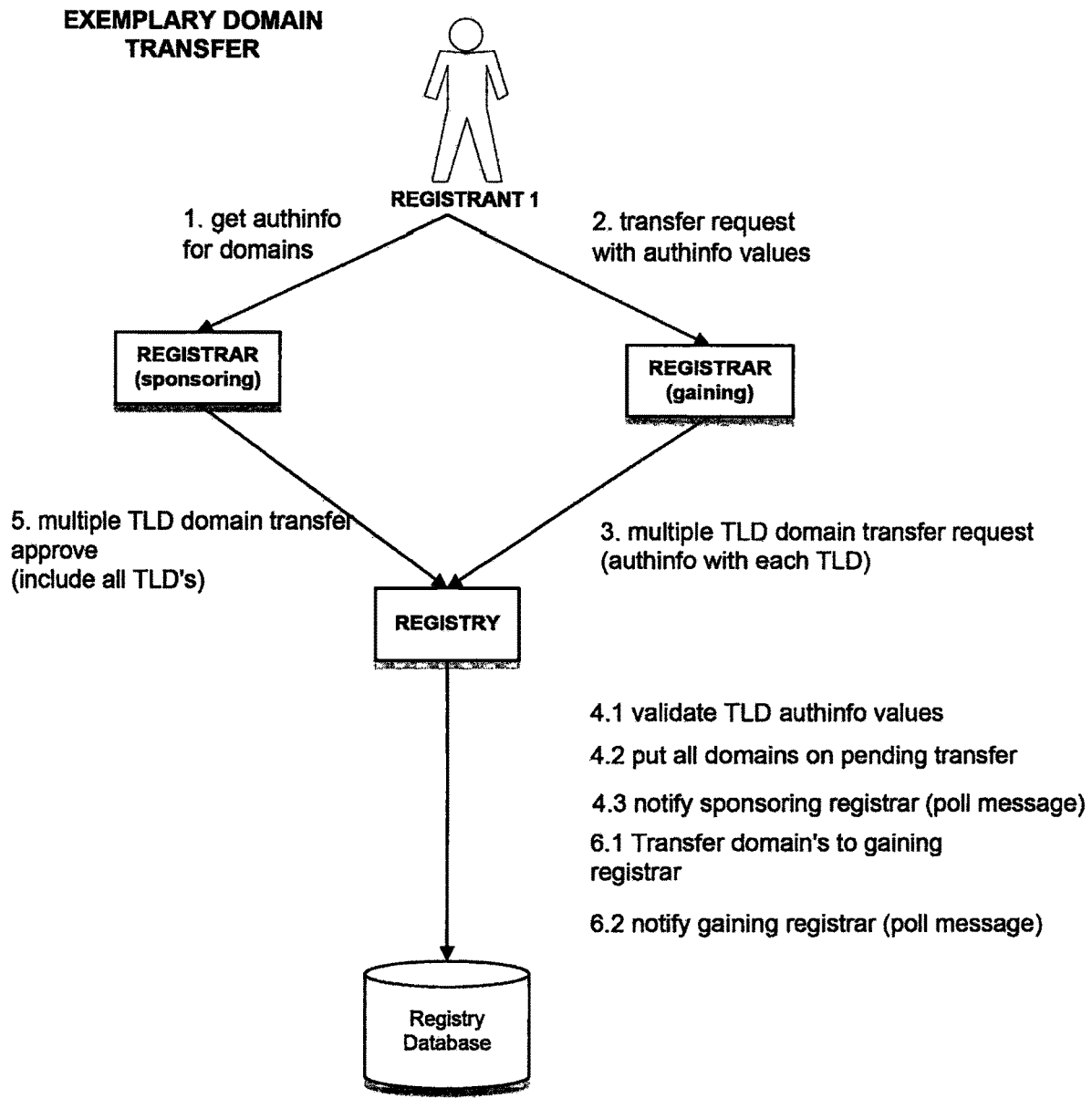
FIG. 12 demonstrates an exemplary domain transfer consistent with the present invention between a current Registrar (Sponsoring) and a new Registrar (Gaining).

FIG. 12 demonstrates an exemplary domain transfer between a current Registrar (Sponsoring) and a new Registrar (Gaining). As shown in FIG. 12, a Registrant submits a request to the sponsoring Registrar to get authinfo information for the domain or domains that the Registrant wishes to transfer. The Registrant then sends a transfer request along with those obtained authinfo values to the gaining Registrar. The gaining Registrar submits a multiple TLD domain transfer request, including the authinfo with each TLD to the Registry. The Registry then validates the TLD authinfo values, puts all domains on pending transfer, and notifies the sponsoring Registrar using, for example, a poll message. The sponsoring Registrar then submits a multiple TLD domain transfer approve, which may include all TLDs, to the Registry. The Registry then transfers the domains to the gaining Registrar and notifies the gaining Registrar via a poll message.

Figure 13:
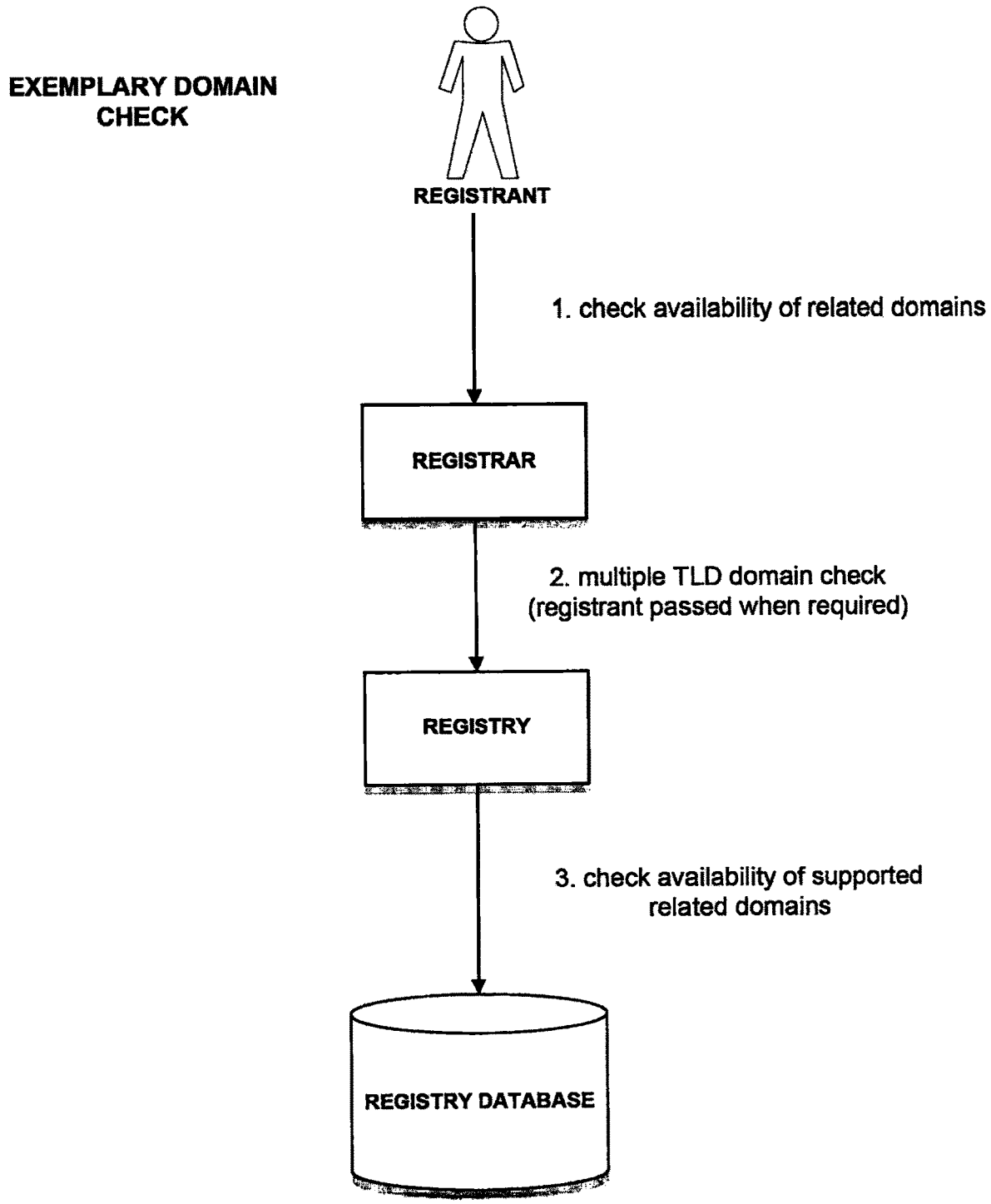
FIG. 13 demonstrates an exemplary domain check consistent with the present invention.

FIG. 13 demonstrates an exemplary domain check. A Registrant sends a request to a Registrar to check the availability of a number of domains related to a namespace. The Registrar then sends a multiple TLD domain check to the Registry. The Registry then validates consistency of sponsorship and checks the availability of supported related domains.

In some exemplary embodiments, in order for system 100 to perform the requested action, a new EPP extension is used that defines a set of domain commands to treat the domains of a label (e.g., the existing TLDs and the requested TLD) to be handled and validated as a group. This EPP extension may handle sponsorship changes (Registrar and Registrant) as a single command across the domains of the related TLDs and may return the related TLDs in the info response of any one of the domains. The following includes exemplary uses of exemplary EPP extensions for the various commands and responses.

Domain Check:

During a domain check command and response, an EPP extension to the Domain Check Command and Response could return the availability and/or registered information across a set of grouped TLDs for a domain. For illustrative purposes, this new EPP extension may be called a Multiple TLD extension, although other names for the extension can be used. For example, if ".net" and ".nét" are grouped TLDs, and example.net is registered, the client can execute the EPP extension to get the availability information across all of the TLDs in the TLD set. If the validation module 245 determines that there is inconsistency of sponsorship between any of the domains in the domain set, then the registrant cannot register any domains in the set. If the sponsorship information matches one of the domains in the TLD set, then other domains in the TLD set can be registered. The following includes an exemplary uses of the exemplary EPP extension for the Domain Check Command with the different responses.

Multiple TLD Domain Check Command without Registrant:

The following example shows a Multiple TLD Domain Check of example.com without the registrant passed for doing sponsorship validation only based on the Registrar (e.g., for a thick TLD).

```
<?xml version="1.0" encoding="UTF-8" standalone="no"?>
<epp xmlns="urn:ietf:params:xml:ns:epp-1.0"
        xmlns:xsi="http://www.w3.org/2001/XMLSchema-instance"
        xsi:schemaLocation="urn:ietf:params:xml:ns:epp-1.0
        epp-1.0.xsd">
    <command>
        <check>
            <domain:check
            xmlns:domain="urn:ietf:params:xml:ns:doniain-1.0"
            xsi:schemaLocation="urn:ietf:params:xml:ns:domain-1.0
            domain-1.0.xsd">
                <domain:name>example.com</domain:name>
            </domain:check>
        </check>
        <extension>
            <multipleTld:check
            xmlns:multipleTld="http://www.verisign.com/epp/multipleTld-1.0"
            xsi:schemaLocation="http://www.verisign.com/epp/multipleTld-
            1.0
            multipleTld-1.0.xsd"/>
        </extension>
        <clTRID>ABC-12345</clTRID>
    </command>
</epp>
```

Multiple TLD Domain Check Command with Registrant:

The following example shows a Multiple TLD Domain Check of example.com with the registrant passed for validating the Registrar and Registrant (e.g., Thick TLD) in returning the availability of the domains returned.

```
<?xml version="1.0" encoding="UTF-8" standalone="no"?>
<epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0
    epp-1.0.xsd">
    <command>
     <check>
        <domain:check
        xmlns:domain="urn:ietf:params:xmlns:domain-1.0"
        xsi:schemaLocation="urn:ietf:params:xml:ns:domain-1.0
        domain-1.0.xsd">
            <domain:name>example.com</domain:name>
        </domain:check>
     </check>
     <extension>
        <multipleTld:check
        xmlns:multipleTld="http://www.verisign.com/epp/multipleTld-
        1.0"
        xsi:schemaLocation="http://www.verisign.com/epp/multipleTld-
        1.0
        multipleTld-1.0.xsd">
            <multipleTld:registrant>sh8013</multipleTld:registrant>
        </multipleTld:check>
     </extension>
    <clTRID>ABC-12345</clTRID>
    </command>
</epp>
```

Multiple TLD Domain Check Response by Sponsoring Client (with or without Registrar):

The following is an example of a Multiple TLD Domain Check Response where the sponsorship information matches and the list of <multipleTld:cd> elements provide the availability information of each of the TLDs. In this case the domain example.com and example.idncom2 are already registered, but example.idncom1 is not and is therefore available for registration. Notice that the <domain:name> avail attribute is set to "1" to indicate that domains can be registered in the TLD set with the appropriate registrant value.

```
<?xml version="1.0" encoding="UTF-8" standalone="no"?>
<epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0
    epp-1.0.xsd">
    <response>
        <result code="1000">
            <msg>Command completed successfully</msg>
        </result>
        <resData>
         <domain:chkData
         xmlns:domain="urn:ietf:params:xml:ns:domain-1.0"
         xsi:schemaLocation="urn:ietf:params:xml:ns:domain-1.0
         domain-1.0.xsd">
            <domain:cd>
                <domain:name avail="1">example.com</domain:name>
            </domain:cd>
         </domain:chkData>
        </resData>
        <extension>
            <multipleTld:chkData
            xmlns:multipleTld="http://www.verisign.com/epp/multipleTld-
            1.0"
            xsi:schemaLocation="http://www.verisign.com/epp/multipleTld-
            1.0
            multipleTld-1.0.xsd">
                <multipleTld:cd>
                    <multipleTld:tld avail="0">com</multipleTld:tld>
                </multipleTld:cd>
                <multipleTld:cd>
                    <multipleTld:tld avail="1">idncom1</multipleTld:tld>
                </multipleTld:cd>
                <multipleTld:cd>
                    <multipleTld:tld avail="0">idncom2</multipleTld:tld>
                </multipleTld:cd>
            </multipleTld:chkData>
        </extension>
        <trID>
```

```
                <clTRID>ABC-12345c/clTRID>
                <svTRID>54322-XYZc/svTRID>
        </trID>
        </response>
</epp>
```

Multiple TLD Domain Check Response by Non-Sponsoring Client:

The following is an example of a Multiple TLD Domain Check Response where the sponsorship information does not match, so the <domain:name> avail="0" is set to indicate that the client cannot register the domain and all of the <multipleTld:cd> elements also have avail="0" to show that none of the TLDs can be registered by the client.

```
<?xml version="1.0" encoding="UTF-8" standalone="no"?>
<epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0
    epp-1.0.xsd">
    <response>
        <result code="1000">
            <msg>Command completed successfully</msg>
        </result>
        <resData>
            <domaim:chkData
            xmlns:domain="urn:ietf:params:xml:ns:domain-1.0"
                xsi:schemaLocation="urn:ietf:params:xml:ns:domain-1.0
                domain-1.0.xsd">
            <domain:cd>
                <domain:name avail="0">example.com</domain:name>
                <domain:reason>Incorrect sponsorship</domain:reason>
            </domain:cd>
        </domain:chkData>
        </resData>
        <extension>
            <multipleTld:chkData
            xmlns:multipleTld="http://www.verisign.com/epp/multipleTld-1.0"
            xsi:schemaLocation="http://www.verisign.com/epp/multipleTld-1.0
            multipleTld-1.0.xsd">
                <multipleTld:cd>
                    <multipleTld:tld avail="0">com</multipleTld:tld>
                </multipleTld:cd>
                <multipleTld:cd>
                    <multipleTld:tld avail="0">idncom1</multipleTld:tld>
                </multipleTld:cd>
                <multipleTld:cd>
                    <multipleTld:tld avail="0">idncom2</multipleTld:tld>
                </multipleTld:cd>
            </multipleTld:chkData>
        </extension>
        <trID>
            <clTRID>ABC-12345</clTRID>
            <svTRID>54322-XYZ</svTRID>
        </trID>
    </response>
</epp>
```

Multiple TLD Domain Check Response for Unregistered Domain Names Across all TLDs:

The following is an example of a Multiple TLD Domain Check Response where all of the domains within the TLD set are available, so both the <domain:name> avail attribute is set to "1" and all of the <multipleTld:tld> elements have the avail attribute set to "1".

```
<?xml version="1.0" encoding="UTF-8" standalone="no"?>
<epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0
    epp-1.0.xsd">
```

```
<response>
    <result code="1000">
        <msg>Command completed successfully</msg>
    </result>
    <resData>
        <domain:chkData
        xmlns:domain="urn:ietf:params:xml:ns:domain-1.0"
        xsi:schemaLocation="urn:ietf:params:xml:ns:domain-1.0
        domain-1.0.xsd">
            <domain:cd>
                <domain:name avail="1">example.com</domain:name>
            </domain:cd>
        </domain:chkData>
    </resData>
    <extension>
        <multipleTld:chkData
        xmlns:multipleTld="http://www.verisign.com/epp/multipleTld-1.0"
        xsi:schemaLocation="http://www.verisign.com/epp/multipleTld-
        1.0
        multipleTld-1.0.xsd">
            <multipleTld:cd>
                <multipleTld:tld avail="1">com</multipleTld:tld>
            </multipleTld:cd>
            <multipleTld:cd>
                <multipleTld:tld avail="1">idncom1</multipleTld:tld>
            </multipleTld:cd>
            <multipleTld:cd>
                <multipleTld:tld avail="1">idncom2</multipleTld:tld>
            </multipleTld:cd>
        </multipleTld:chkData>
    </extension>
    <trID>
        <clTRID>ABC-12345</clTRID>
        <svTRID>54322-XYZ</svTRID>
    </trID>
</response>
</epp>
```

Multiple TLD Domain Check Response for Unregistered Domain Names Across all TLDs:

The following is an example of a Multiple TLD Domain Check Response where all of the domains within the TLD set are available, so both the <domain:name> avail attribute is set to "1" and all of the <multipleTld:tld> elements have the avail attribute set to "1".

Domain Create:

During a domain create, a server that supports the exemplary EPP extension can provide domain sponsorship validation across all matching TLDs. For example, if a client wishes to register "example.net," the client contacts a Registrar, which then communicates with the Registry to create the domain. Any conflicting registrations (e.g., example.nét) may then be validated.

Figure 14:
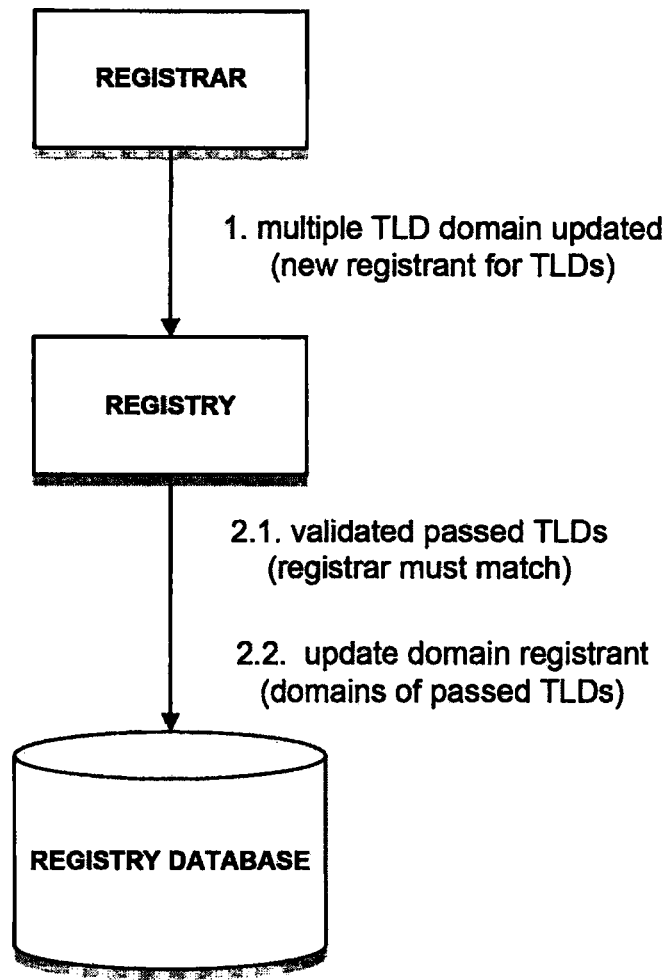
FIG. 14 demonstrates an exemplary domain update consistent with the present invention

Doman Update:

The Domain Update Command allows for the Registrant to be changed, which can result in the sponsorship information of domains across matching TLDs to become inconsistent. To ensure that the Registrant is consistent, a new EPP extension to the Domain Update may set the Registrant across a list of TLDs. For example, assume that Acme Corporation wishes to transfer its ownership of Acme.com and all related TLDs to Beta Corporation. As shown in FIG. 14, the Registrar would send the EPP request to the Registry (step 1), and the Registry would validate the passed TLDs (e.g., validate that the Registrar making the request matches the Registrar stored in the Registry database) (step 2.1). If those passed TLDs were validated, the Registry would update the domain Registrant to Beta Corporation (step. 2.2).

The exemplary MultipleTLD Domain Update Command would extend the <domain:update> as defined in RFC 5731 (EPP Domain Name Mapping) by having the domain label without the TLD set in the <domain:name> element, by having the new Registrant set in the <domain:chg><domain:registrant> element and using the extension to define the set of TLDs that the command applies to. The response time SLA for the <domain:update> may not apply to the Multiple TLD Domain Update Command. The registrant update may only be applied to the thick TLD's that have domains registered. The following is an example of updating the Registrant to sh8013 for the example domain across the TLD's "com", "comidn1", and "comidn1". If "com" is not thick then the update will not be applied to it.

```
<?xml version="1.0" encoding="UTF-8" standalone="no"?>
<epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0
    epp-1.0.xsd">
    <command>
        <update>
            <domain:update
            xmlns:domain="urn:ietf:params:xml:ns:domain-1.0"
```

```
            xsi:schemaLocation="urn:ietf:params:xml:ns:domain-1.0
            domain-1.0.xsd">
                <domain:name>example</domain:name>
                <domain:chg>
                    <domain:registrant>sh8013</domain:registrant>
                </domain:chg>
            </domain:update>
        </update>
        <extension>
            <multipleTld:update
            xmlns:multipleTld="http://www.verisign.com/epp/multipleTld-
            1.0"
            xsi:schemaLocation="http://www.verisign.com/epp/multipleTld-
            1.0
            multipleTld-1.0.xsd">
                <multipleTld:tld>com</multipleTld:tld>
                <multipleTld:tld>comidn1</multipleTld:tld>
                <multipleTld:tld>comidn2</multipleTld:tld>
            </multipleTld:update>
        </extension>
        <clTRID>ABC-12345</clTRID>
    </command>
</epp>
```

Domain Info Response:

Since domains across multiple TLD's are grouped, then executing a Domain Info Command on one of the domains within the group should return the list of TLD's that are registered for the domain second-level label as an extension to the Domain Info Response defined in RFC 5731 "Extensible Provisioning Protocol (EPP) Domain Name Mapping". The list of TLD's could include the TLD of the <domain:name> element. The exemplary extension may be returned if a client includes the Multiple TLD Extension (http://www.verisign.com/epp/multipleTld-1.0) as an <extURI> element in the EPP <login> command. The following is an example of the Domain Info Response with the Multiple TLD Domain Info Response Extension that indicates that example is registered across the TLD's "com", "idncom1", and "idncom2".

```
<?xml version="1.0" encoding="UTF-8" standalone="no"?>
<epp xmlns="urn:ietf:params:xml:ns:epp-1.0"
        xmlns:xsi="http://www.w3.org/2001/XMLSchema-instance"
        xsi:schemaLocation="urn:ietf:params:xml:ns:epp-1.0
        epp-1.0.xsd">
    <response>
    <result code="1000">
            <msg>Command completed successfully</msg>
    </result>
    <resData>
     <domain:infData
     xmlns:domain="urn:ietf:params:xml:ns:domain-1.0"
     xsi:schemaLocation="urn:ietf:params:xml:ns:domain-1.0
     domain-1.0.xsd">
        <domain:name>example.com</domain:name>
        <domain:roid>EXAMPLE1-REP</domain:roid>
        <domain:status s="ok"/>
        <domain:registrant>jd1234c</domain:registrant>
        <domain:contact type="admm">sh8013c/domain:contact>
        <domain:contact type="tech">sh8013</domain:contact>
        <domain:ns>
            <domain:hostObj>ns1.example.com</domain:hostObj>
            <domain:hostObj>ns2.example.com</domain:hostObj>
        </domain:ns>
        <domain:host>ns1.example.com</domain:host>
        <domain:host>ns2.example.com</domain:host>
        <domain:clID>ClientX</domain:clID>
        <domain:crID>ClientY</domain:crID>
        <domain:crDate>1999-04-03T22:00:00.0Z</domain:crDate>
        <domain:upID>ClientX</domain:upID>
        <domain:upDate>1999-12
    03T09:00:00.0Z</domain:upDate>
     <domain:exDate>2005-04-
    03T22:00:00.0Z</domain:exDate>
    <domain:trDate>2000-04-08T09:00:00.0Z</domain:trDate>
    <domain:authInfo>
            <domain:pw>2fooBARc/domain:pw>
        </domain:authInfo>
    </domain:infData>
    </resData>
    <extension>
            <multipleTld:infData
```

```
            xmlns:multipleTld="http://www.verisign.com/epp/multipleTld-1.0"
            xsi:schemaLocation="http://www.verisign.com/epp/multipleTld-1.0
            multipleTld-1.0.xsd">
                <multipleTld:tld>com</multipleTld:tld>
                <multipleTld:tld>comidn1</multipleTld:tld>
                <multipleTld:tld>comidn2</multipleTld:tld>
                </multipleTld:infData>
        </extension>
        <trID>
                <clTRID>ABC-12345</clTRID>
                <svTRID>54322-XYZ</svTRID>
        </trID>
        </response>
</epp>
```

Domain Transfer:

An exemplary EPP extension to a Domain Transfer request may keep the sponsorship the same across all of the TLDs in the TLD set. In particular, the domain transfer request may be extended to support transferring all of the domains at the same time. The other transfer operations (cancel, accept, and reject) may work across the group of domains in a similar fashion. Additionally the transfer response and subsequent poll message may be extended to provide information for the group of domains. For example, assume that a Registrant wishes to change its Registrar from Registrar 1 to Registrar 2. In order to make this transfer request, the Registrant obtains authinfo for the domains from the sponsoring Registrar (Registrar 1) and provides that authinfo to the gaining Registrar (Registrar 2). The Registrar then sends the EPP Request to the Registry, including the authinfo with each TLD. The Registry then validates the TLD authinfo values, puts all of the domains on pending transfer, and notifies the sponsoring registrar of the changed. Subsequently, the sponsoring Registrar approves the transfer of the domains and the Registry transfers the domains to the gaining registrar.

Below is a sample XML for a Multiple TLD Domain Transfer Request Command for the example second-level domain with the TLDs "com," "idncom1," and "idncom2." Since each domain can have its own lifecycle and Authorization information value, the domain transfer command includes the option of supplying a unique period per domain and requires an authorization information (authinfo) value per domain.

```
<?xml version="1.0" encoding="UTF-8" standalone="no"?>
<epp xmlns="urn:ietf:params:xml:ns:epp-1.0"
xmlns:xsi="http://www.w3.org/2001/XMLSchema-instance"
xsi:schemaLocation="urn:ietf:params:xml:ns:epp-1.0
epp-1.0.xsd">
    <command>
        <transfer op="request">
            <domain:transfer
            xmlns:domain="urn:ietf:params:xml:ns:domain-1.0"
            xsi:schemaLocation="urn:ietf:params:xml:ns:domain-1.0
            domain-1.0.xsd">
                <domain:name>example</domain:name>
            </domain:transfer>
        </transfer>
<extension>
        <multipleTld:transfer
        xmlns:multipleTld="http://www.verisign.com/epp/multipleTld-
        1.0"
        xsi:schemaLocation="http://www.verisign.com/epp/multipleTld -1.0
        multipleTld-1.0.xsd">
            <multipleTld:tld>
                <multipleTld:name>com</multipleTld:name>
                <multipleTld:period unit="y">1</multipleTld:period>
                <multipleTld:authInfo>
                    <multipleTld:pw>1fooBAR</multipleTld:pw>
                </multipleTld:authInfo>
            </multipleTld:tld>
            <multipleTld:tld>
                <multipleTld:name>idncom1</multipleTld:name>
                <multipleTld:period unit="y">2</multipleTld:period>
                <multipleTld:authInfo>
                    <multipleTld:pw>2fooBARc/multipleTld:pw>
                </multipleTld:authInfo>
            </multipleTld:tld>
            <multipleTld:tld>
                <multipleTld:name>idncom2</multipleTld:name>
                <multipleTld:period unit="y">3</multipleTld:period>
                <multipleTld:authInfo>
                    <multipleTld:pw>3fooBAR</multipleTld:pw>
                </multipleTld:authInfo>
            </multipleTld:tld>
        </multipleTld:transfer>
```

```
        </extension>
      <clTRID>ABC-12345</clTRID>
    </command>
</epp>
```

The following is an example of a Multiple TLD Domain Transfer Approve Command that is the same for the Multiple TLD Domain Transfer Reject Command, Multiple TLD Domain Transfer Cancel Command, and Multiple TLD Domain Transfer Query Command, where the op="approve" is replaced with op="reject", op="cancel", and op="query" respectively.

```
<?xml version="1.0" encoding="UTF-8" standalone="no"?>
<epp xmlns="urn:ietf:params:xml:ns:epp-1.0"
        xmlns:xsi="http://www.w3.org/2001/XMLSchema-instance"
        xsi:schemaLocation="urn:ietf:params:xml:ns:epp-1.0
        epp-1.0.xsd">
    <command>
        <transfer op="approve">
            <domain:transfer
            xmlns:domain="urn:ietf:params:xml:ns:domain-1.0"
            xsi:schemaLocation="urn:ietf:params:xml:ns:domain-1.0
            domain-1.0.xsd">
                <domain:name>example</domain:name>
            </domain:transfer>
        </transfer>
        <extension>
          <multipleTld:transfer
          xmlns:multipleTld="http://www.verisign.com/epp/multipleTld-1.0"
          xsi:schemaLocation="http://www.verisign.com/epp/multipleTld
          -1.0 multipleTld-1.0.xsd">
           <multipleTld:tld>
               <multipleTld:name>com</multipleTld:name>
           </multipleTld:tld>
           <multipleTld:tld>
               <multipleTld:name>idncom1</multipleTld:name>
           </multipleTld:tld>
           <multipleTld:tld>
               <multipleTld:name>idncom2</multipleTld:name>
           </multipleTld:tld>
          </multipleTld:transfer>
        </extension>
        <clTRID>ABC-12345</clTRID>
    </command>
</epp>
```

All of the Multiple TLD Domain Transfer Commands (Request, Approve, Reject, Cancel, and Query) may return the Multiple TLD Domain Transfer Response. Since all of the attributes of a transfer request (trStatus, reID, reDate, acID, acDate) are consistent across all of the domains, they are returned using the RFC 5731 "Extensible Provisioning Protocol (EPP) Domain Name Mapping" elements, but each domain can have a different expiration date (exDate), so the list of TLDs in the extension may include the expiration date that will be set when the transfer goes through or the expiration date that was set or would have been set after the transfer was approved, auto-approved, rejected, or cancelled. Below is an example Multiple TLD Domain Transfer Response for a transfer request of the "example" domain across the TLD's "com", "idncom1", and "idncom2".

```
<?xml version="1.0" encoding="UTF-8" standalone="no"?>
<epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0
    epp-1.0.xsd">
    <response>
        <result code="1000">
            <msg>Command completed successfully</msg>
        </result>
        <resData>
            <domain:trnData
            xmlns:domain="urn:ietf:params:xml:ns:domain-1.0"
            xsi:schemaLocation="urn:ietf:params:xml:ns:domain-1.0
            domain-1.0.xsd">
              <domain:name>example</domain:name>
              <domain:trStatus>pending</domain:trStatus>
              <domain:reID>ClientX</domain:reID>
              <domain:reDate>2011-06-06T22:00:00.0Z</domain:reDate>
              <domain:acID>ClientY</domain:acID>
              <domain:acDate>2011-06-11T22:00:00.0Z</domain:acDate>
            </domain:trnData>
        </resData>
        <extension>
            <multipleTld:transfer
            xmlns:multipleTld="http://www.verisign.com/epp/multipleTld-1.0"
            xsi:schemaLocation="http://www.verisign.com/epp/multipleTld-
            1.0 multipleTld-1.0.xsd">
                <multipleTld:tld>
                    <multipleTld:name>com</multipleTld:name>
                    <multipleTld:exDate>2012-09-
                    08T22:00:00.0Z</multipleTld:exDate>
                </multipleTld:tld>
                <multipleTld:tld>
                    <multipleTld:name>idncom1</multipleTld:name>
                    <multipleTld:exDate>2013-09-
                    08T22:00:00.0Z</multipleTld:exDate>
```

```
            </multipleTld:tld>
            <multipleTld:tld>
                <multipleTld:name>idncom2</multipleTld:name>
                <multipleTld:exDate>2014-09-
                08T22:00:00.0Z</multipleTld:exDate>
            </multipleTld:tld>
        </multipleTld:transfer>
    </extension>
    <trID>
        <clTRID>ABC-12345</clTRID>
        <svTRID>54322-XYZ</svTRID>
    </trID>
    </response>
</epp>
```

Consent:

An exemplary consent identifier may be included in an extension to the Create Command of Provisioning Object (e.g., Domain, Email Forward, and the like) that support consent. The consent identifier may be supplied to the server in a Consent Create Command along with the domain name. The Registrar and subsequently the Registrant may have the freedom to supply the consent identifier to another party to include in an extension to the Domain Create that will be validated by the server and if valid will authorize the Create of one or more of the related domains.

Consent Mapping:

Exemplary Consent Mapping may be responsible for the management of the Consent Records by defining the structure of a Consent Record and defining the command and responses for creating, deleting, and getting information on the Consent Records. The Consent Identifier that is created via the Consent Mapping may be passed with the create commands of the provisioning objects like a Domain using the Consent Extension. Although the primary use case for the use of the Consent is for domains, the Consent Mapping is made more generic to support other object types like Email Forward objects in DotName with the inclusion of the type element. The complete consent identifier may be made up of a client specified identifier and/or a server generated identifier. An example is below:

```
<consent:consentID>
    <consent:clConsentID>ABC-1245</consent:clConsentID>
    <consent:svConsentID>DEF-6789</consent:svConsentID>
</consent:consentID>
```

The additional attributes of a Consent may include the following:

1. type—A pre-defined string defined by the server policy indicating the time of provisioning object that consent is related to. A standard set of types should be defined by server policy across, but is left out of the protocol for flexibility in applying consent to any provisioning object type. An example of a value for type is DOMAIN for domain consent records.
2. name—provisioning object name being given consent.
3. crID—Identifier of the client that created the consent.
4. crDate—Date and time that the consent was created in UTC.
5. exDate—Date and time that the consent expires in UTC. Server policy may define the expiry period for consents, such as, for example 2 weeks.
6. usedID—Identifier of the client that used the consent.
7. usedDate—Date the time that the consent was used in UTC. When the consent is passed on the create of a provisioning object like a domain, the consent should be marked as used with the date and time that it was used.

Consent Info:

An exemplary Consent Info Command may be sent by the consent holder for a previously created consent using the Consent Identifier returned in the Consent Create Response. In addition to providing the Consent Identifier, the type may be provided to determine which consent listing to query. Below is an example of a Consent Info Command:

```
<?xml version="1.0" encoding="UTF-8" standalone="no"?>
<epp xmlns="urn:ietf:params:xml:ns:epp-1.0"
    xmlns:xsi=http://www.w3.org/2001/XMLSchema-instance
    xsi:schemaLocation="urn:ietf:params:xml:ns:epp-1.0 epp-1.0.xsd">
    <command>
        <info>
        <consent:info
        xmlns:consent="http://www.verisign.com/epp/consent-1.0"
        xsi:schemaLocation="http://www.verisign.com/epp/consent-1.0
        consent-1.0.xsd">
                    <consent:type>DOMAIN</consent:type>
                    <consent:consentID>
                        <consent:clConsentID>ABC-1234</consent:clConsentID>
                        <consent:svConsentID>DEF-6789</consent:svConsentID>
                    </consent:consentID>
        </consent:info>
        </info>
        <clTRID>ABC-12345</clTRID>
    </command>
</epp>
```

Consent Create:

An exemplary Consent Create Command may be sent by the consent holder for one of the available domains in the set of related TLD's. The elements that may be needed with the Consent Create Command include:
1. type—A pre-defined string defined by the server policy indicating the time of provisioning object that consent is related to. A value of DOMAIN would be used for domain consents.
2. name—provisioning object name being given consent. The domain name is provided for domain consents.
3. clConsentID—Client specified consent identifier. The identifier is a string and will follow the complexity requirements defined by the server policy.

An example of the EPP Consent Create Command is below for the example.tld domain and the client consisten identifier ABC-1234 is:

```
<?xml version="1.0" encoding="UTF-8" standalone="no"?>
    <epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0
    epp-1.0.xsd">
        <command>
            <create>
            <consent:create
            xmlns:consent="http://www.verisign.com/epp/consent-1.0"
            xsi:schemaLocation="http://www.verisign.com/epp/consent-1.0
            consent-1.0.xsd">
            <consent:type>DOMAIN</consent:type>
            <consent:name>example.tld</consent:name>
            <consent:clConsentID>ABC-1234</consent:clConsentID>
            </consent:create>
            </create>
            <clTRID>ABC-12345</clTRID>
        </command>
</epp>
```

Create Command:

The exemplary Consent Extension may define additional elements for the EPP Create Command. The exemplary Consent Extension may contain the following child elements:
1. consentID—Used to reference the consent identifier created by the Consent Create Command and returned in the Consent Create Response. The consentID includes both the client specified consent identifier and the server generated consent identifier. The type of the provisioning object is implied by the EPP Create Command that is being extended. So in the case of extending the Domain Create Command, the type is implied with the value of DOMAIN.

Below is an example of an exemplary Domain Create Command for the domain example.tld that includes the exemplary Consent Extension to ungroup related namespaces:

```
<?xml version="1.0" encoding="UTF-8" standalone="no"?>
    <epp xmlns="urn:ietf:params:xml:ns:epp-1.0"
    xmlns:xsi="http://www.w3.org/2001/XMLSchema-instance"
    xsi:schemaLocation="urn:ietf:params:xml:ns:epp-1.0
    epp-1.0.xsd">
    <command>
    <create>
        <domain:create
        xmlns:domain="urn:ietf:params:xml:ns:domain-1.0"
        xsi:schemaLocation="urn:ietf:params:xml:ns:domain-1.0
        domain-1.0.xsd">
        <domain:name>example.tld</domain:name>
        <domain:authInfo>
            <domain:pw>2fooBAR</domain:pw>
        </domain:authInfo>
        </domain:create>
    </create>
    <extension>
    <consentExt:create
    xmlns:consentExt="http://www. verisign.com/epp/consentExt-1.0"
    xsi:schemaLocation="http://www.verisign.com/epp/consentExt-1.0
    consentExt-1.0.xsd">
    <consentExt:consentID>
    <consentExt:clConsentID>ABC-1234</consentExt:clConsentID>
```

```
            <consentExt:svConsentID>DEF-6789</consentExt:svConsentID>
          </consentExt:consentID>
        </consentExt:create>
      </extension>
      <clTRID>ABC-12345</clTRID>
    </command>
</epp>
```

Figure 15:
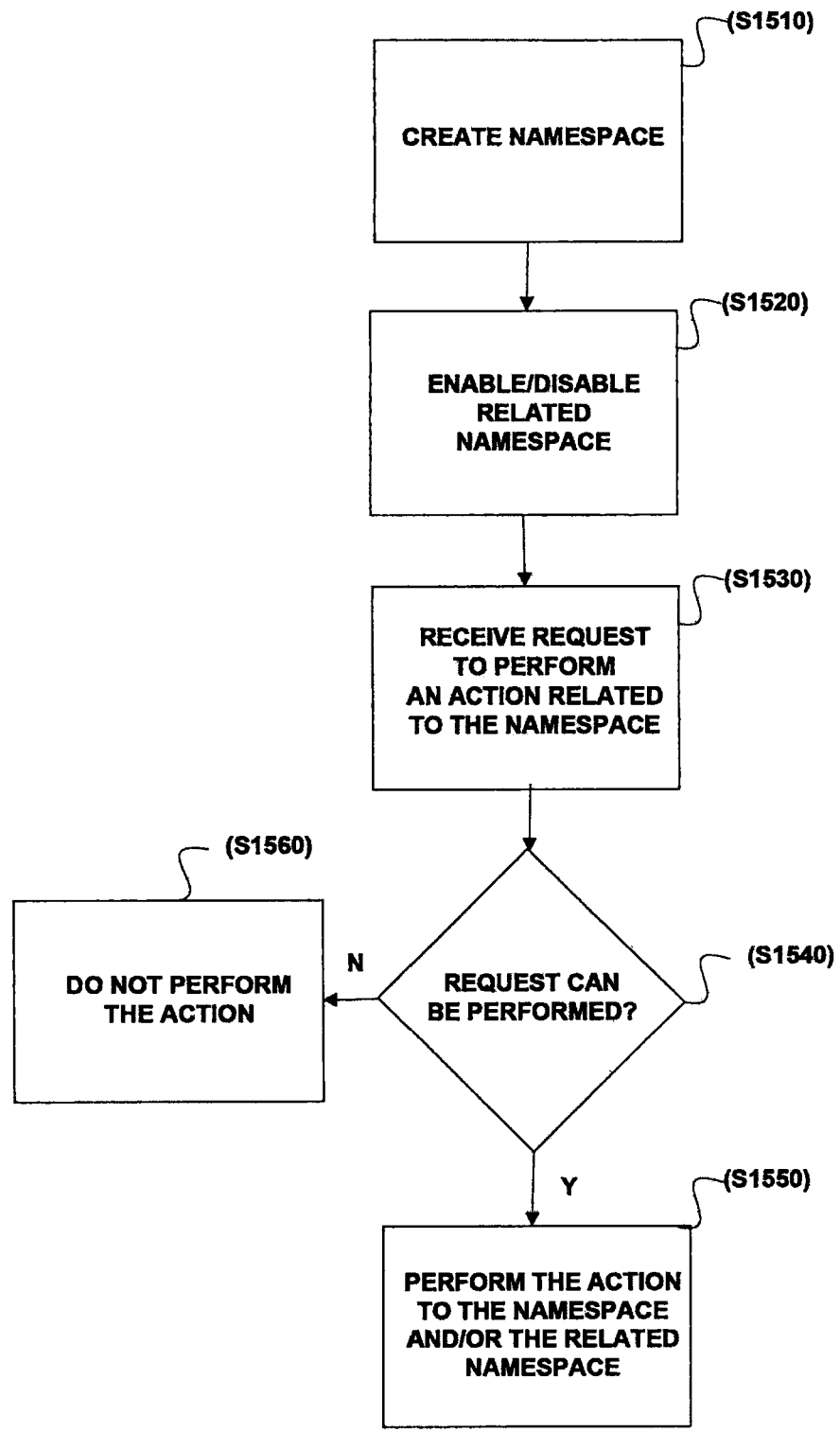
FIG. 15 is a flowchart demonstrating another exemplary domain transfer process, where the initial namespace is treated as the master namespace, and the related namespaces are treated as children of the initial namespace.

FIG. 15 is a flowchart demonstrating another exemplary related domain process, where the initial namespace is treated as the master namespace, and the related namespaces are treated as children of the initial namespace. As shown in FIG. 14, a namespace is created (S1510) such as, for example, an ASCII domain, and corresponding child namespaces (e.g., IDN domains) are enabled or disabled via an EPP extension to the domain update command (S1520) and returned in an extension to the info response. When a Registrar enables the first IDN domain in an ASCII domain update, the registrant contact may be set automatically. Support for any namespace-specific attributes may be handled in separate domain updates, including DNSSEC attributes (DS Data) that may be set per domain, where you can't share the same DS data of an ASCII domain with IDN domains. A Registry may then receive a request to perform an action (e.g., a transfer) related to the master namespace or child namespace(s) (S1530). After receiving the request, the Registry may determine whether the Registrar making the request is the owner of the master namespace (S1540). If so, the Registry will perform the requested action (S1550) and, if not, the Registry will not perform the requested action (S1560).

A domain may have the following attributes associated with it: owning registrar; name servers; DS records; statuses; expiration date; and authinfo. Attributes of each child namespaces, such as an IDN TLD, may be managed separately than the master namespace, and may be subject to certain restrictions. Examples of such restrictions may include: (1) the master namespace may have to exist at the time of registration of the child namespace; (2) the owning registrar of the child namespace has to be the same as the master namespace's owning registrar; (3) the expiration date of the child namespace may not go beyond the expiration date of the master namespace; (4) transfers of child namespaces may not be supported; (5) transfer of the master namespace may implicitly transfer all associated child namespaces; and (6) checks for child namespaces by registrars who don't own the master namespace will be returned as unavailable.

As described above, systems and methods consistent with the invention provide a namespace protection system that allows a Registrant to protect its intellectual property rights. For purposes of explanation only, certain aspects and embodiments are described herein with reference to the components illustrated in FIGS. 1-13. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Additionally, while many of the exemplary embodiments are related to TLDs, the invention can be applied to any namespace. For example, the invention could be applied across related objects within a TLD such as the ability to register multiple variants of an IDN domain under the same TLD. As another example, the invention could be applied across objects of different types that are related, such as JOHN.SMITH.NAME or JOHN@SMITH.NAME.

Further, the sequences of events described in FIGS. 1-13 are exemplary and not intended to be limiting. Thus, other process stages may be used, and even with the processes depicted in FIGS. 1-13, the particular order of events may vary without departing from the scope of the present invention. Moreover, certain process stages may not be present and additional stages may be implemented in FIGS. 1-13. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claim.

What is claimed is:

1. A system for validating a consistency of sponsorship comprising a memory device storing instructions that, when executed by a processor, cause the processor to perform operations comprising:
   obtaining, at a server of a Domain Name System (DNS) registry, over a network, a request for a domain service, wherein the request is from a client device;
   providing the request for domain services from a server of a DNS registry to a processing unit of the DNS registry, wherein the processing unit performs operations comprising:
      determining, by the DNS registry, that a second-level domain label of a requested domain name in a first top level domain is related to a second-level domain label of an existing domain name in a second top level domain that is grouped in a top level domain database with the first top level domain;
      validating consistency of sponsorship between the requested domain name in the first top level domain and the existing domain name in the second top level domain;
      based on validating the consistency of sponsorship:
         grouping the requested domain name in the first top level domain with the existing domain name in the second top level domain, and
         linking the requested domain name in the first top level domain with the existing domain name in the second top level domain in a linked domain database associated with the DNS registry; and
      providing, to the client device over the network, a result of the request to a client device.

2. The system of claim 1, wherein validating consistency of sponsorship comprises:
   if the first top level domain and the second top level domain are thin: validating that a first registrar associated with the first top level domain and a second registrar associated with the second top level domain are related; and if the first top level domain and the second top level domain are thick: validating that (1) the first registrar and the second registrar are related; and (2) a first registrant associated with the first top level domain and a second registrant associated with the second top level domain are related.

3. The system of claim 2, wherein validating that the first registrar associated with the first top level domain and the second registrar associated with the second top level domain are related comprises: validating that the first registrar associated with the first top level domain and the second registrar associated with the second top level domain are the same, wherein validating that (1) the first registrar and the second registrar are related and (2) the first registrant associated with the first top level domain and the second registrant associated with the second top level domain are related comprises: validating that (1) the first registrar and the second registrar are the same and (2) the first registrant associated with the first top level domain and the second registrant associated with the second top level domain are the same.

4. The system of claim 1, wherein the operations further comprise:

registering one or more variants of an internationalized domain name with a shared top level domain in the top level domain database.

5. The system of claim 1, wherein the operations further comprise:

determining whether a variant of a requested second level domain name is stored in a variant database, wherein the variant database is configured to store information related to variants of second level domain labels.

6. The system of claim 1, further comprising using one or more extensible provisioning protocol (EPP) commands, wherein the one or more extensible provisioning protocol (EPP) commands comprises a domain check command that returns an availability or registered information across a set of grouped top level domains.

7. The system of claim 1, wherein the operations further comprise:

determining that a variant grouped with the requested domain name exists in the first top level domain or the second top level domain.

8. The system of claim 1, wherein one or more extensible provisioning protocol (EPP) commands are used to update the top level domain database and the linked domain database.

9. The system of claim 2, wherein the operations further comprise:

if there is not consistency of sponsorship, determining whether a consent holder has given consent to allow at least one of the first registrant and the first registrar to register the requested domain name;

if the consent holder has given consent, allowing the at least one of the first registrant and the first registrar to register the requested domain name; and if the consent holder has not given consent, not allowing the at least one of the first registrant and the first registrar to register the requested domain name.

10. The system of claim 9, wherein the operations further comprise:

validating a received consent identifier by determining whether the received consent identifier is associated with a stored consent identifier, wherein the first registrant is allowed to register the requested domain name if the received consent identifier is validated.

11. The system of claim 9, wherein the consent holder is automatically assigned based on whether the second top level domain is thin or thick.

12. A method for validating a consistency of sponsorship comprising:

obtaining, at a server of a Domain Name System (DNS) registry, over a network, a request for a domain service, wherein the request is from a client device;

providing the request to a processing unit of the DNS registry;

determining, by the DNS registry, that a second-level domain label of a requested domain name in a first top level domain is related to a second-level domain label of an existing domain name in a second top level domain that is grouped in a top level domain database with the first top level domain;

validating consistency of sponsorship between the requested domain name in the first top level domain and the existing domain name in the second top level domain;

based on validating the consistency of sponsorship: grouping the requested domain name in the first top level domain with the existing domain name in the second top level domain and linking the requested domain name in the first top level domain with the existing domain name in the second top level domain in a linked domain database associated with the DNS registry; and providing, to the client device over the network, a result of the request.

13. The method of claim 12, wherein validating consistency of sponsorship comprises:

if the first top level domain and the second top level domain are thin: validating that a first registrar associated with the first top level domain and a second registrar associated with the second top level domain are related; and if the first top level domain and the second top level domain are thick: validating that (1) the first registrar and the second registrar are related; and (2) a first registrant associated with the first top level domain and a second registrant associated with the second top level domain are related.

14. The method of claim 13, wherein validating that the first registrar associated with the first top level domain and the second registrar associated with the second top level domain are related comprises validating that the first registrar associated with the first top level domain and the second registrar associated with the second top level domain are the same, wherein validating that (1) the first registrar and the second registrar are related and (2) the first registrant associated with the first top level domain and the second registrant associated with the second top level domain are related comprises validating that (1) the first registrar and the second registrar are the same and (2) the first registrant associated with the first top level domain and the second registrant associated with the second top level domain are the same.

15. The method of claim 12, further comprising:
registering one or more variants of an internationalized domain name with a shared top level domain in the top level domain database.

16. The method of claim 12, further comprising:
determining whether a variant of a requested second level domain name is stored in a variant database, wherein the variant database is configured to store information related to variants of second level domain labels.

17. The method of claim 12, further comprising using one or more extensible provisioning protocol (EPP) commands, wherein the one or more extensible provisioning protocol (EPP) commands comprises a domain check command that returns an availability or registered information across a set of grouped top level domains.

18. One or more non-transitory computer-readable media for validating a consistency of sponsorship comprising a plurality of instructions that, in response to execution by a processor, cause the processor to perform operations comprising:
obtaining, at a server of a Domain Name System (DNS) registry, over a network, a request for a domain service, wherein the request is from a client device;
providing the request to a processing unit of the DNS registry;
determining, by the DNS registry, that a second-level domain label of a requested domain name in a first top level domain is related to a second-level domain label of an existing domain name in a second top level domain that is grouped in a top level domain database with the first top level domain;
validating consistency of sponsorship between the requested domain name in the first top level domain and the existing domain name in the second top level domain;
based on validating the consistency of sponsorship:
grouping the requested domain name in the first top level domain with the existing domain name in the second top level domain and linking the requested domain name in the first top level domain with the existing domain name in the second top level domain in a linked domain database associated with the DNS registry; and
providing, to the client device over the network, a result of the request.

19. The one or more non-transitory computer-readable media of claim 18, wherein validating consistency of sponsorship comprises:
if the first top level domain and the second top level domain are thin: validating that a first registrar associated with the first top level domain and a second registrar associated with the second top level domain are related; and
if the first top level domain and the second top level domain are thick: validating that (1) the first registrar and the second registrar are related; and (2) a first registrant associated with the first top level domain and a second registrant associated with the second top level domain are related.

20. The one or more non-transitory computer-readable media of claim 19, wherein validating that the first registrar associated with the first top level domain and the second registrar associated with the second top level domain are related comprises validating that the first registrar associated with the first top level domain and the second registrar associated with the second top level domain are the same,
wherein validating that (1) the first registrar and the second registrar are related and (2) the first registrant associated with the first top level domain and the second registrant associated with the second top level domain are related comprises validating that (1) the first registrar and the second registrar are the same and (2) the first registrant associated with the first top level domain and the second registrant associated with the second top level domain are the same.

* * * * *